United States Patent
Anguchamy et al.

(10) Patent No.: US 10,886,526 B2
(45) Date of Patent: Jan. 5, 2021

(54) SILICON-SILICON OXIDE-CARBON COMPOSITES FOR LITHIUM BATTERY ELECTRODES AND METHODS FOR FORMING THE COMPOSITES

(71) Applicant: Envia Systems, Inc., Newark, CA (US)

(72) Inventors: Yogesh Kumar Anguchamy, Newark, CA (US); Haixia Deng, Fremont, CA (US); Yongbong Han, San Francisco, CA (US); Charan Masarapu, Fremont, CA (US); Sujeet Kumar, Newark, CA (US); Herman A. Lopez, Sunnyvale, CA (US)

(73) Assignee: Zenlabs Energy, Inc., Fremont, CA (US)

( * ) Notice: Subject to any disclaimer, the term of this patent is extended or adjusted under 35 U.S.C. 154(b) by 742 days.

(21) Appl. No.: 13/917,472

(22) Filed: Jun. 13, 2013

(65) Prior Publication Data
US 2014/0370387 A1    Dec. 18, 2014

(51) Int. Cl.
*H01M 4/36*  (2006.01)
*H01M 4/583*  (2010.01)
(Continued)

(52) U.S. Cl.
CPC .............. *H01M 4/364* (2013.01); *H01M 4/04* (2013.01); *H01M 4/485* (2013.01); *H01M 4/583* (2013.01); *H01M 10/052* (2013.01)

(58) Field of Classification Search
CPC ...... H01M 10/052; H01M 4/04; H01M 4/485; H01M 4/583; H01M 4/364; Y02E 60/122
See application file for complete search history.

(56) References Cited

U.S. PATENT DOCUMENTS

| | | | |
|---|---|---|---|
| 4,086,404 A | 11/1978 | Vissers et al. | |
| 5,395,711 A | 3/1995 | Tahara et al. | |

(Continued)

FOREIGN PATENT DOCUMENTS

| | | |
|---|---|---|
| EP | 2079120 A1 | 7/2009 |
| EP | 2141759 A1 | 1/2010 |

(Continued)

OTHER PUBLICATIONS

Achiha et al., "Electrochemical Behavior of Nonflammable Organo-Fluorine Compunds for Lithium Ion Batteries," Journal of the Electrochemical Society 156(6): A483-A488 (2009).

(Continued)

*Primary Examiner* — Adam A Arciero
(74) *Attorney, Agent, or Firm* — Christensen, Fonder, Dardi & Herbert PLLC; Peter S. Dardi

(57) ABSTRACT

Composite silicon based materials are described that are effective active materials for lithium ion batteries. The composite materials comprise processed, e.g., high energy mechanically milled, silicon suboxide and graphitic carbon in which at least a portion of the graphitic carbon is exfoliated into graphene sheets. The composite materials have a relatively large surface area, a high specific capacity against lithium, and good cycling with lithium metal oxide cathode materials. The composite materials can be effectively formed with a two step high energy mechanical milling process. In the first milling process, silicon suboxide can be milled to form processed silicon suboxide, which may or may not exhibit crystalline silicon x-ray diffraction. In the second milling step, the processed silicon suboxide is milled with graphitic carbon. Composite materials with a high specific capacity and good cycling can be obtained in particular with balancing of the processing conditions.

23 Claims, 9 Drawing Sheets

(51) Int. Cl.
*H01M 4/04* (2006.01)
*H01M 4/485* (2010.01)
*H01M 10/052* (2010.01)

(56) References Cited

U.S. PATENT DOCUMENTS

| | | | |
|---|---|---|---|
| 5,792,577 A | 8/1998 | Ejiri et al. | |
| 6,083,644 A | 7/2000 | Watanabe et al. | |
| 6,235,427 B1 | 5/2001 | Idota et al. | |
| 6,251,822 B1 | 6/2001 | Peng et al. | |
| 6,335,115 B1 | 1/2002 | Meissner | |
| 6,528,208 B1 | 3/2003 | Thackeray et al. | |
| 6,638,662 B2 | 10/2003 | Takeuchi et al. | |
| 6,645,671 B2 | 11/2003 | Tsutsumi et al. | |
| 6,677,082 B2 | 1/2004 | Thackeray et al. | |
| 6,680,143 B2 | 1/2004 | Thackeray et al. | |
| 6,699,336 B2 | 3/2004 | Turner et al. | |
| 6,759,160 B2 | 7/2004 | Fukuoka et al. | |
| 6,893,621 B2 | 5/2005 | Fukuoka et al. | |
| 6,899,970 B1 | 5/2005 | Rogers et al. | |
| 6,979,513 B2 | 12/2005 | Kelley et al. | |
| 7,037,581 B2 | 5/2006 | Aramata et al. | |
| 7,195,842 B1 | 3/2007 | Fujimoto et al. | |
| 7,205,072 B2 | 4/2007 | Kang et al. | |
| 7,235,330 B1 | 6/2007 | Fujimoto et al. | |
| 7,252,907 B2 | 8/2007 | Takeuchi et al. | |
| 7,297,446 B2 | 11/2007 | Fukui et al. | |
| 7,432,015 B2 | 10/2008 | Jeong et al. | |
| 7,435,402 B2 | 10/2008 | Kang et al. | |
| 7,452,632 B2 | 11/2008 | Lee et al. | |
| 7,514,369 B2 | 4/2009 | Li et al. | |
| 7,517,614 B2 | 4/2009 | Jeong et al. | |
| 7,575,830 B2 | 8/2009 | Kawamura et al. | |
| 7,615,314 B2 | 11/2009 | Kawakami et al. | |
| 7,658,863 B2 | 2/2010 | Aramata et al. | |
| 7,754,389 B2 | 7/2010 | Yamaguchi et al. | |
| 7,776,473 B2 | 8/2010 | Aramata et al. | |
| 7,790,316 B2 | 9/2010 | Aramata et al. | |
| 7,833,662 B2 | 11/2010 | Kim et al. | |
| 7,851,085 B2 | 12/2010 | Obrovac et al. | |
| 7,871,727 B2 | 1/2011 | Obrovac et al. | |
| 8,389,160 B2 | 3/2013 | Venkatachalam et al. | |
| 8,394,534 B2 | 3/2013 | Lopez et al. | |
| 2001/0031396 A1 | 10/2001 | Tsutsumi et al. | |
| 2002/0164479 A1 | 11/2002 | Matsubara et al. | |
| 2003/0129494 A1* | 7/2003 | Kaneda | H01M 4/133 429/231.1 |
| 2003/0157014 A1 | 8/2003 | Wang et al. | |
| 2003/0157407 A1 | 8/2003 | Kosuzu et al. | |
| 2003/0211390 A1 | 11/2003 | Dahn et al. | |
| 2003/0215711 A1 | 11/2003 | Armata et al. | |
| 2004/0023117 A1 | 2/2004 | Imachi et al. | |
| 2004/0033419 A1* | 2/2004 | Funabiki | C01B 33/113 429/218.1 |
| 2004/0076885 A1 | 4/2004 | Sato et al. | |
| 2004/0146734 A1 | 7/2004 | Miller et al. | |
| 2004/0151951 A1 | 8/2004 | Hyung et al. | |
| 2004/0191630 A1 | 9/2004 | Kawamura et al. | |
| 2004/0214085 A1 | 10/2004 | Sheem et al. | |
| 2004/0241548 A1 | 12/2004 | Nakamoto et al. | |
| 2005/0019670 A1 | 1/2005 | Amine et al. | |
| 2005/0031942 A1 | 2/2005 | Hennige et al. | |
| 2005/0175901 A1 | 8/2005 | Kawakami et al. | |
| 2005/0214644 A1 | 9/2005 | Aramata et al. | |
| 2005/0233213 A1 | 10/2005 | Lee et al. | |
| 2006/0003227 A1* | 1/2006 | Aramata | H01M 4/0421 429/218.1 |
| 2006/0040182 A1 | 2/2006 | Kawakami et al. | |
| 2006/0051673 A1 | 3/2006 | Johnson et al. | |
| 2006/0068285 A1 | 3/2006 | Yamaguchi et al. | |
| 2006/0115734 A1 | 6/2006 | Ishihara et al. | |
| 2006/0188784 A1 | 8/2006 | Sudoh et al. | |
| 2007/0003836 A1 | 1/2007 | Suzuki et al. | |
| 2007/0048612 A1 | 3/2007 | Nakajima et al. | |
| 2007/0059601 A1 | 3/2007 | Natsume et al. | |
| 2007/0099436 A1 | 5/2007 | Kogetsu et al. | |
| 2007/0148544 A1 | 6/2007 | Le | |
| 2007/0190413 A1 | 8/2007 | Lee et al. | |
| 2007/0207381 A1 | 9/2007 | Ohtsuka et al. | |
| 2007/0224508 A1 | 9/2007 | Aramata et al. | |
| 2007/0254102 A1 | 11/2007 | Fukuoka et al. | |
| 2007/0259113 A1 | 11/2007 | Kizaki et al. | |
| 2008/0095930 A1 | 4/2008 | Natsume et al. | |
| 2008/0113269 A1 | 5/2008 | Yamamoto et al. | |
| 2008/0131772 A1 | 6/2008 | Jambunathan et al. | |
| 2008/0131783 A1 | 6/2008 | Choi et al. | |
| 2008/0135801 A1 | 6/2008 | Kizaki et al. | |
| 2008/0160265 A1 | 7/2008 | Hieslmair et al. | |
| 2008/0193831 A1 | 8/2008 | Mah et al. | |
| 2008/0213671 A1 | 9/2008 | Kogetsu et al. | |
| 2008/0226988 A1 | 9/2008 | Minami et al. | |
| 2008/0268347 A1 | 10/2008 | Ohzuku et al. | |
| 2009/0004564 A1 | 1/2009 | Ishida et al. | |
| 2009/0029256 A1 | 1/2009 | Mah et al. | |
| 2009/0047577 A1 | 2/2009 | Iwamoto et al. | |
| 2009/0053608 A1 | 2/2009 | Choi et al. | |
| 2009/0092899 A1 | 4/2009 | Treger | |
| 2009/0117466 A1 | 5/2009 | Zhamu et al. | |
| 2009/0130562 A1 | 5/2009 | Mao et al. | |
| 2009/0169994 A1 | 7/2009 | Mah et al. | |
| 2009/0186267 A1 | 7/2009 | Tiegs | |
| 2009/0239151 A1 | 9/2009 | Nakanishi et al. | |
| 2009/0263707 A1 | 10/2009 | Buckley et al. | |
| 2009/0305131 A1 | 12/2009 | Kumar et al. | |
| 2009/0317721 A1 | 12/2009 | Shirane et al. | |
| 2009/0317722 A1 | 12/2009 | Watanabe | |
| 2009/0325061 A1 | 12/2009 | Lim | |
| 2010/0009261 A1 | 1/2010 | Watanabe | |
| 2010/0047671 A1 | 2/2010 | Chiang et al. | |
| 2010/0055563 A1 | 3/2010 | Nakanishi et al. | |
| 2010/0086853 A1 | 4/2010 | Venkatachalam et al. | |
| 2010/0086854 A1 | 4/2010 | Kumar et al. | |
| 2010/0119939 A1 | 5/2010 | Misumi et al. | |
| 2010/0119942 A1 | 5/2010 | Kumar | |
| 2010/0151332 A1 | 6/2010 | Lopez et al. | |
| 2010/0159366 A1 | 6/2010 | Shao-Horn et al. | |
| 2010/0178566 A1 | 7/2010 | Kogetsu et al. | |
| 2010/0233543 A1 | 9/2010 | Numata et al. | |
| 2010/0243951 A1 | 9/2010 | Watanabe et al. | |
| 2010/0288970 A1 | 11/2010 | Watanabe et al. | |
| 2011/0017528 A1 | 1/2011 | Kumar et al. | |
| 2011/0052981 A1 | 3/2011 | Lopez et al. | |
| 2011/0052989 A1 | 3/2011 | Venkatachalam et al. | |
| 2011/0076556 A1 | 3/2011 | Karthikeyan et al. | |
| 2011/0085960 A1 | 4/2011 | Mukasyan et al. | |
| 2011/0111294 A1 | 5/2011 | Lopez et al. | |
| 2011/0111298 A1 | 5/2011 | Lopez et al. | |
| 2011/0111303 A1* | 5/2011 | Kung | H01B 1/18 429/231.8 |
| 2011/0136019 A1 | 6/2011 | Amiruddin et al. | |
| 2011/0163274 A1 | 7/2011 | Plee et al. | |
| 2011/0171529 A1 | 7/2011 | Kono et al. | |
| 2011/0244331 A1 | 10/2011 | Karthikeyan et al. | |
| 2012/0028105 A1 | 2/2012 | Kumar et al. | |
| 2012/0056590 A1* | 3/2012 | Amiruddin | H01M 10/0525 320/130 |
| 2012/0070725 A1 | 3/2012 | Venkatachalam et al. | |
| 2012/0105007 A1 | 5/2012 | Amiruddin et al. | |
| 2012/0107680 A1 | 5/2012 | Amiruddin et al. | |
| 2012/0121982 A1 | 5/2012 | Harimoto et al. | |
| 2012/0264020 A1 | 10/2012 | Burton et al. | |
| 2012/0295155 A1 | 11/2012 | Deng et al. | |
| 2013/0078508 A1 | 3/2013 | Tolbert et al. | |
| 2013/0157147 A1 | 6/2013 | Li et al. | |
| 2013/0189575 A1 | 7/2013 | Anguchamy et al. | |
| 2013/0224585 A1 | 8/2013 | Oh et al. | |
| 2013/0295439 A1 | 11/2013 | Masarapu et al. | |
| 2014/0065464 A1 | 3/2014 | Masarapu et al. | |
| 2014/0308585 A1 | 10/2014 | Han et al. | |
| 2016/0006021 A1 | 1/2016 | Lopez et al. | |
| 2016/0079591 A1 | 3/2016 | Yang et al. | |
| 2017/0194627 A1 | 7/2017 | Deng et al. | |
| 2018/0241036 A1 | 8/2018 | Jo et al. | |

(56) References Cited

U.S. PATENT DOCUMENTS

FOREIGN PATENT DOCUMENTS

| JP | 07065825 | | 3/1995 |
|---|---|---|---|
| JP | 2001118568 | | 4/2001 |
| JP | 2010055775 | | 3/2010 |
| KR | 1020040096381 | A | 11/2004 |
| KR | 1020040100058 | A | 12/2004 |
| KR | 100493960 | B1 | 6/2005 |
| KR | 1020060087003 | A | 8/2006 |
| KR | 1020060087183 | A | 8/2006 |
| KR | 2012-0073603 | A | 7/2012 |
| KR | 10-2017-0063373 | A | 6/2017 |
| WO | 0135473 | A1 | 5/2001 |
| WO | 2004025757 | A2 | 3/2004 |
| WO | 2005011030 | A1 | 2/2005 |
| WO | 2005065082 | A2 | 7/2005 |
| WO | 2005076389 | A2 | 8/2005 |
| WO | 2006109930 | A1 | 10/2006 |
| WO | 2007126257 | A1 | 11/2007 |
| WO | 2011053736 | A1 | 5/2011 |

OTHER PUBLICATIONS

Chan et al., "High-performance lithium battery anodes using silicon nanowires," Nature Nanotechnology Jan. 2008, vol. 3, pp. 31-35.
Chen et al., "Electrochemical Insertion/extraction of Lithium in Multiwall Carbon Nanotube/Sb and SnSb0.5 Nanocomposites," published by the Massachusetts Institute of Technology, division of Molecular Engineering of Biological and Chemical Systems, Dec. 2003.
Choi et al., "Effect of fluoroethylene carbonate additive on interfacial properties of silicon thin-film electrode" Journal of Power Sources 161 (2006) 1254-1259. (Abstract only).
Cui et al., "Carbon-silicon core-shell nanowires as high capacity electrode for lithium ion batteries," Nano Lett. 9 (9):3370-3374 (2009).
Guerfi et al., "SiOx-graphite as negative for high energy Li-ion batteries," Journal of Power Sources 196:5667-5673 (2011).
Ishikawa et al., "Li-ion Battery Performance with FSI-based Ionic Liquid Electrolyte and Fluorinated Solvent-based Electrolyte" ECS Trans. 33:29-36 (2010) (Abstract).
Jeong et al., "A Nanostructured SiAl0.2O Anode Material for Lithium Batteries," Chem. Mater. 22:5570-5579 (2010).
Kang et al., "Enhancing the rate capability of high capacity xLi2Mn03 • (1-x)LiMO2 (M=Mn, Ni, Co) electrodes by Li-Ni-PO4 treatment," Electrochemistry Communications 11:748-751 (2009).
Kang et al., Layered Li(Li0.2Ni0.15+0.5zCo0.10Mn0.55-0.5z)O2-zFz cathode materials for Li-ion secondary batteries, Journal of Power Sources 146:654-657 (2005).
Kim et al., Synthesis of spherical Li{ni(1/3-z)Co(1/3-z)Mn(1/3-z)Mgz]O2 as positive electrode material for lithium ion battery, Electrochimica Acta 51:2447-2453 (2006).
Kim et al., Improvement of High-Voltage Cycling Behavior of Surface Modified Li[Ni1/3Co1/3Mn1/3]O2 Cathodes by Fluorine Substitution for Li-Ion Batteries, Journal of the Electrochemical Society 152 (9) A1707-A1713 (2005).
Lee et al., "High capacity Li[Li0.2Ni0.2Mn0.6]O2 cathode materials via a carbonate co-precipitation method," J. of Power Sources, 162:1346-1350 (2006).
Liu et al., "Improvement of cycling stability of Si anode by mechanochemical reduction and carbon coatings." Journal of Power Sources, 189, pp. 480-484 (2009).
Mcmillan et al. "Fluoroethylene carbonate electrolyte and its use in lithium ion batteries with graphite anodes," Journal of Power Sources 81-2: 20-26 (1999) (Abstract).
Miyachi et al., "Electrochemical Properties and Chemical Structures of Metal-Doped SiO Anodes for Li-Ion Rechargeable Batteries," J. Electrochem. Soc. 154(4):A376-A380 (2007).
Naoi et al., "Nonflammable Hydrofluoroether for Lithium-Ion Batteries: Enhanced Rate Capability, Cyclability, and Low-Temperature Performance," J. Electrochem. Soc. 156(4):A272-A276 (2009) (Abstract only).
Profatilova et al., "Enhanced thermal properties of the solid electrolyte interphase formed on graphite in an electrolyte with fluoroethylene carbonate," Electrochimica Acta 54: 4445-4450 (2009).
Ruffo et al., "Impedance Analysis of Silicon Nanowire Lithium Ion Battery Anodes," J. Phys. Chem. C 113:11390-11398 (2009).
Schoenenberger et al., "Multiwall carbon nanotubes," http://physicsworld.com/cws/article/print/606 (printed Oct. 7, 2009).
Shi et al., "Nano-SnSb alloy deposited on MCMB as an anode material for lithium ion batteries," J. Materials Chemistry, 11(5):1502-1505 (2001).
Sun et al., "AlF3-Coating to Improve High Voltage Cycling Performance of Li[Ni1/3Co1/3Mn1/3]O2 Cathode Materials for Lithium Secondary Batteries," J. of the Electrochemical Society, 154 (3), A168-A172 (2007).
Sun et al., "Significant Improvement of high voltage cycling behavior AlF3-coated LiCoO2 cathode," Electrochemistry Communications 8:821-826 (2006).
Tabuchi et al., "Li-doping process for LixSiO-negative active material synthesized by chemical method for lithium ion cells," Journal of Power Sources 146:507-509 (2005).
Thackeray et al., "Comments on the structural complexity of lithium-rich Li1+xM1-xO2 electrodes (M=Mn,Ni,Co) for lithium batteries," Electrochemistry Communications 8:1531-1538 (2006).
Veluchamy et al., "Improvement of cycle behaviour of SiO/C anode compositie by themnochemically generated . Li4S1O4 inert phase for lithium ion batteries," Journal of Power Sources 188:574-577 (2009).
Wang et al., "Lithium Insertion in Carbon-Silicon Composite Materials Produced by Mechanical Milling," J. Electrochem. Soc., 145(8): 2751-2758 (1998).
Woo et al., "Significant Improvement of Electrochemical Performance of AlF3-Coated Li[Ni0.8Co0.1Mn0.1]O2 Cathode Materials," J. of the Electrochemical Society, 154 (11) A1005-A1009 (2007).
Yamaki et al., "Characterization and Thermal Stability of SEI between a Graphite Electrode and Methyl Difluoroacetate-based Electrolyte," Abstract #236 from the 210th Meeting of the Electrochemical Society (2006).
Yang et al., "Nanosized silicon-based composite derived by in situ mechanochemical reduction for lithium ion batteries," Journal of Power Sources, 164, pp. 880-884 (2007).
Yoshio et al., "Electrochemical behaviors of silicon based anode material," Journal of Power Sources 146:10-14 (2005).
(2001) Liu et al., "Electrical transport in doped multiwalled carbon nanotubes," Physical Review B, vol. 63,161404 (R), pp. 1-4 (2001).
Veluchamy et al., "A new SiO/C Anode Composition for Lithium-ion Battery." Journal of Power Sources 179 (2008) 367-370, published Dec. 2007.
Yang et al, "SiOx-based anodes for secondary lithium batteries." Solid State Ionics 152-153 (2002) 125-129, available Mar. 2002.
Wang et al., "Nano-sized SiOx-/C Composite Anode for Lithium Ion Batteries." Journal of Power Sources 196 (2011) 4811-4815 available Jan. 2011.
Hu et al., "Superior Storage Performance of a Si@SiOx/C Nanocomposite as Anode Material for Lithium-Ion Batteries," Agnewandte Chemie International Edition, 2008, 47, 1645-1649, available Feb. 2008.
Hua-Chao Tao, "Interweaved Si@SiOx/C nanoporous spheres as anode materials for Li-ion batteries", Solid State Ionics 220, Publish 2012, p. 1-6.
Kim et al., "Three-Dimensional Porous Silicon Particles for Use in High-Performance Lithium Secondary Batteries," Angew. Chem. Int. Ed. 2008, 47, 10151-10154, (Year 20108).
Magasinki et al., "High-performance lithium-ion anodes using a hierarchical bottom-up approach." Nature Materials, vol. 9, pp. 353-358, Apr. 2010.

\* cited by examiner

SILICON-SILICON OXIDE-CARBON COMPOSITES FOR LITHIUM BATTERY ELECTRODES AND METHODS FOR FORMING THE COMPOSITES

GOVERNMENT RIGHTS

Development of the inventions described herein was at least partially funded with government support through U.S. Department of Energy grant ARPA-E-DE-AR0000034 and California Energy Commission grant ARV-09-004, and the U.S. government has certain rights in the inventions.

FIELD OF THE INVENTION

The invention relates to high capacity silicon based negative electrode active materials for lithium ion batteries. The invention further relates to methods of forming the materials and batteries incorporating the materials.

BACKGROUND OF THE INVENTION

Lithium batteries are widely used in consumer electronics due to their relatively high energy density. For some current commercial batteries, the negative electrode material can be graphite, and the positive electrode materials can comprise lithium cobalt oxide ($LiCoO_2$), lithium manganese oxide ($LiMn_2O_4$), lithium iron phosphate ($LiFePO_4$), lithium nickel oxide ($LiNiO_2$), lithium nickel cobalt oxide (LiNiCoO$_2$), lithium nickel cobalt manganese oxide (LiNiMnCoO$_2$), lithium nickel cobalt aluminum oxide ($LiNiCoAlO_2$) and the like. For negative electrodes, lithium titanate is an alternative to graphite with good cycling properties, but it has a lower energy density. Other alternatives to graphite, such as tin oxide and silicon, have the potential for providing increased energy density. However, some high capacity negative electrode materials have been found to be unsuitable commercially due to high irreversible capacity loss and poor discharge and recharge cycling believed to be related to structural changes and anomalously large volume expansions, especially for silicon, that are associated with lithium intercalation/alloying.

New positive electrode active materials are presently under development that can significantly increase the corresponding energy density and power density of the corresponding batteries. Particularly promising positive electrode active materials are based on lithium rich layered-layered compositions. In particular, the improvement of battery capacities can be desirable for vehicle applications, and for vehicle applications the maintenance of suitable performance over a large number of charge and discharge cycles is important.

SUMMARY OF THE INVENTION

In a first aspect, the invention pertains to a composite material comprising processed silicon suboxide and graphitic carbon. Generally, the composite material has at least a portion of the graphitic carbon in graphene sheets. In some embodiments, the composite material has a BET surface area from about 5 $m^2/g$ to about 35 $m^2/g$ and a discharge capacity of at least about 800 mAh/g at a rate of C/20 discharged from 1.5V to 0.005V against lithium metal.

In further aspects, the invention pertains to a composite material comprising processed silicon suboxide and from about 0.5 weight percent to 20 weight percent graphitic carbon, in which at least a portion of the graphitic carbon is in graphene sheets. In some embodiments, the material has a discharge capacity of at least about 800 mAh/g at a rate of C/20 discharged from 1.5V to 0.005V against lithium metal, and the material has a 50th cycle discharge capacity that is at least about 87% of the 5th cycle discharge capacity when cycled against lithium from 1.5V to 0.005V at a discharge rate of C/3.

In additional aspects, the invention pertains to a method for forming a composite material comprising processed silicon oxide and graphitic carbon at least a portion of which is in graphene sheets, the method comprising performing high energy mechanical milling of graphite powder with reduced silicon oxide material having a BET surface area from about 2.5 $m^2/g$ to about 20 $m^2/g$ and a D50 volume average secondary particle size of no more than about 10 microns, to form the composite material.

In other aspects, the invention pertains to a lithium ion secondary battery comprising a positive electrode, a negative electrode, a separator between the positive electrode comprising a lithium metal oxide and the negative electrode and an electrolyte comprising lithium ions. In general, the negative electrode comprises a composite material comprising processed silicon suboxide and graphitic carbon in which at least a portion of the graphitic carbon is in graphene sheets. The battery can have at a discharge rate of C/3 at the 50th cycle a positive electrode specific capacity of at least about 150 mAh/g and a negative electrode specific capacity of at least about 750 mAh/g when discharged from 4.5V to 1V.

BRIEF DESCRIPTION OF THE DRAWINGS

FIG. 7b displays an EDS mapping of carbon concentration in the processed silicon suboxide-graphitic carbon composite displayed in FIG. 7a.

FIG. 7c displays an EDS mapping of oxygen concentration in the processed silicon suboxide-graphitic carbon composite displayed in FIG. 7a.

FIG. 7d display an EDS mapping of the silicon concentration in the processed silicon suboxide-graphitic carbon composite displayed in FIG. 7a.

DETAILED DESCRIPTION

Figure 1A:
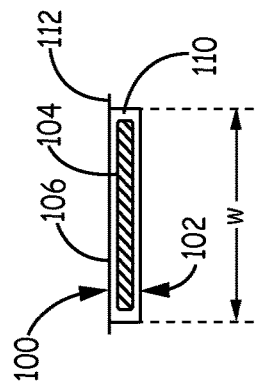
FIG. 1(a) is a schematic diagram of a pouch cell battery having approximate rectangular parallelepipeds configuration.

High energy mechanical milling (HEMM) has been found to be effective under appropriate conditions to form composites of processed silicon suboxides and graphitic carbon with graphene sheets with surprisingly stable cycling and a high cycling capacity. The milling generally is performed in two steps to achieve the desired material. The first milling step comprises high energy mechanical milling of silicon suboxide, e.g. SiO, and a second milling step involves the high energy mechanical milling of a blend of the product of the first step and graphite. In the first step, particle size can be reduced, and silicon suboxide can be chemically modified through high energy mechanical milling to form processed silicon suboxide. Chemical processing of silicon suboxide powders with mechanical forces can be used to form nanoscale elemental silicon, but the degree of chemical processing can be controlled to obtain desired performance of the ultimate processed silicon oxide—graphitic carbon composite material. The high energy mechanical milling of the processed silicon suboxide with graphite can effectively exfoliate significant portions of the graphite into graphene sheets to form a desirable composite material. The processed silicon oxide—graphitic carbon composites exhibit good cycling performance at high specific capacity in a lithium ion battery. The processed silicon suboxide-graphitic carbon composites are a useful negative electrode active material for lithium ion batteries.

Silicon based active materials can exhibit high specific capacities in lithium based batteries, but the materials generally exhibit large volume changes with incorporation and release of lithium into and from the material. The large volume changes have been associated with an undesirably rapid loss of capacity with cycling. The formation of nanoscale silicon active materials has provided some stabilization of the material with respect to cycling. Also, the formation of composites with electrically conductive components, e.g., blended and/or coated components, has also been found to provide some stabilization. The composite materials herein provide desirable high specific capacities and good cycling stability. The exfoliated graphene sheets seem to provide improved performance based on electrical conductivity and stabilization of the cycling nanoscale silicon material forming in situ. The graphitic material can be included in relatively low amounts to accomplish the stabilization objectives without adding excessive weight that can decrease overall specific capacities of the composite material.

Lithium has been used in both primary and secondary batteries. An attractive feature of lithium metal for battery use is its light weight and the fact that it is the most electropositive metal, and aspects of these features can be advantageously captured in lithium-based batteries also. Certain forms of metals, metal oxides, and carbon materials are known to incorporate lithium ions into its structure through intercalation, alloying or similar mechanisms. The positive electrode of a lithium based battery generally comprises an active material that reversibly intercalates/alloys with lithium, e.g., a metal oxide. Lithium ion batteries generally refer to batteries in which the negative electrode active material is also a lithium intercalation/alloying material.

The batteries described herein are lithium based batteries that use a non-aqueous electrolyte solution which comprises lithium ions. For secondary lithium ion batteries during charge, oxidation takes place in the cathode (positive electrode) where lithium ions are extracted and electrons are released. During discharge, reduction takes place in the cathode where lithium ions are inserted and electrons are consumed. Similarly, during charge, reduction takes place at the anode (negative electrode) where lithium ions are taken up and electrons are consumed, and during discharge, oxidation takes place at the anode with lithium ions and electrons being released. Unless indicated otherwise, performance values referenced herein are at room temperature, i.e., about 23±2° C. As described below some of the testing of the silicon based active materials is performed in lithium batteries with a lithium metal electrode or in lithium ion batteries. If the silicon based electrodes are placed in a lithium battery with a lithium foil counter electrode, the silicon based electrode effectively is a positive electrode for the corresponding battery even though the electrode functions as a negative electrode in a lithium ion battery.

The word "element" is used herein in its conventional way as referring to a member of the periodic table in which the element has the appropriate oxidation state if the element is in a composition and in which the element is in its elemental form, M°, only when stated to be in an elemental form. Therefore, a metal element generally is only in a metallic state in its elemental form or an appropriate alloy of the metal's elemental form. In other words, a metal oxide or other metal composition, other than metal alloys, generally is not metallic.

Elemental silicon has attracted significant amount of attention as a potential negative electrode material due to its very high specific capacity with respect to intake and release of lithium. Silicon forms an alloy with lithium, which can theoretically have a lithium content corresponding with more than 4 lithium atoms per silicon atom (e.g., $Li_{4.4}Si$). Thus, the theoretical specific capacity of silicon is on the order of 4000-4400 mAh/g, which is significantly larger than the theoretical capacity of about 370 mAh/g for graphite. Graphite is believed to intercalate lithium to a level of roughly 1 lithium atom for 6 carbon atoms ($LiC_6$). Also, elemental silicon, silicon alloys, silicon composites and the like can have a low potential relative to lithium metal similar to graphite. However, silicon undergoes a very large volume change upon alloying with lithium. A large volume expansion on the order of two to three times of the original volume or greater has been observed, and the large volume changes have been correlated with a significant decrease in the cycling stability of batteries having silicon-based negative electrodes.

As with silicon, oxygen deficient silicon oxide, e.g., silicon oxide, $SiO_x$, $0.1 \leq x \leq 1.9$, can intercalate/alloy with lithium such that the oxygen deficient silicon oxide can perform as an active material in a lithium based battery. The oxygen deficient silicon oxide can incorporate a relatively large amount of lithium such that the material can exhibit a large specific capacity. However, silicon oxide is observed generally to have a capacity that fades quickly with battery cycling, as is observed with elemental silicon. The processed silicon suboxides described herein may take a ranges of compositions with some embodiments exhibiting more or less elemental silicon and/or silicon suboxide compositions, which can exhibit relatively high reversible specific capacities.

When lithium ion batteries are in use, the uptake and release of lithium from the positive electrode and the negative electrode induces changes in the structure of the electroactive material. As long as these changes are essentially reversible, the capacity of the material does not change. However, the capacity of the active materials is observed to decrease with cycling to varying degrees. Thus, after a number of cycles, the performance of the battery falls below acceptable values, and the battery is replaced. Also, on the first cycle of the battery, generally there is an irreversible capacity loss that is significantly greater than per cycle capacity loss at subsequent cycles. The irreversible capacity loss (IRCL) is the difference between the charge capacity of the new battery and the first discharge capacity. The irreversible capacity loss results in a corresponding decrease in the capacity, energy and power for the battery due to changes in the battery materials during the initial cycle.

Silicon based materials generally exhibit a large irreversible capacity loss. In some embodiments, the battery can comprise supplemental lithium, which can compensate for the first cycle the irreversible capacity loss of the silicon based materials as well as to stabilize the cycling of the battery. The supplemental lithium can replace some or all of the active lithium removed from the cycling as a result of the irreversible capacity loss of the silicon based material associated with first cycle changes in the silicon based active material. In a traditional lithium ion battery, the lithium for cycling is supplied only by a positive electrode active material comprising lithium, for example, a lithium metal oxide. The battery is initially charged to transfer lithium from the positive electrode to the negative electrode where it is then available for discharge of the battery. Supplemental lithium results from a supply of active lithium other than the positive electrode active material. It has also been found that supplemental lithium can be very effective for the stabilization of lithium rich high capacity positive electrode active materials. See, published U.S. patent application 2012/0107680 to Amiruddin et al., entitled, "Lithium Ion Batteries With Supplemental Lithium," (hereinafter "the '680 application") incorporated herein by reference. Thus, good cycling has been obtained for realistic lithium ion batteries with supplemental lithium to have relatively high specific capacities. Supplemental lithium, for example, can be supplied by elemental lithium, lithium alloys, a sacrificial lithium source or through electrochemical lithiation of the negative electrode prior to completion of the ultimate battery. The use of supplemental lithium in lithium ion batteries with silicon based negative electrode active material is described further in published U.S. patent application 2011/0111294 to Lopez et al. (the '294 application), entitled "High Capacity Anode Materials for Lithium Ion Battery," incorporated herein by reference.

Silicon suboxide active materials exhibit relatively high proportional IRCL and cycling instability, while providing a lower specific capacity than elemental silicon. The reduction of silicon suboxide to elemental silicon has been accomplished with a reducing metal, and the resulting nanostructured porous silicon has promising lithium cycling properties, as described in copending U.S. patent application Ser. No. 13/354,096 to Anguchamy et al. entitled "Porous Silicon Based Anode Material Formed Using Metal Reduction," incorporated herein by reference. Similarly, silicon polymers and other silicon compositions have been reduced using metal reducing agents or organic reducing agents to form elemental silicon enriched silicon—silicon oxide—carbon composites as described in copending U.S. patent application Ser. No. 13/864,212 to Han et al., entitled "Silicon-Based Active Materials for Lithium Ion Batteries and Synthesis With Solution Processing," incorporated herein by reference. As described herein, high energy mechanical milling is described to modify, and possibly reduce, silicon suboxide to form a material with desirable electrochemical properties.

The milling of SiO with graphite is reported in U.S. Pat. No. 6,638,662 to Kaneda et al. (hereinafter Kaneda patent), entitled "Lithium Secondary Batteries Having Oxide Particles Embedded in Particles of Carbonaceous Material as a Negative Electrode-Active Material," incorporated herein by reference. The Kaneda patent does not describe the formation of any elemental crystalline silicon from their processing or the formation of graphene sheets. The Kaneda patent describes the embedding of the SiO particles within graphite particles, and they describe very high surface areas consistent with highly porous materials. The formation of small amounts of crystalline silicon from the HEMM of SiO was described in published U.S. patent application 2012/0295155 to Deng et al. (hereinafter the Deng application), entitled "Silicon Oxide Based High Capacity Anode Materials for Lithium Ion Batteries," incorporated herein by reference. The Deng application also describes the milling of SiO with graphite, and similar to the results in the Kaneda patent, the results in the Deng application do not demonstrate any crystalline silicon formation from the milling with graphite. The materials described herein have within the resulting composite material processed silicon suboxide, which may or may not result significant quantities of crystalline silicon observable by x-ray diffraction.

Graphene sheets are thin layers of graphitic carbon. Essentially, the sheets have an extended array of hexagonal aromatic carbon rings and have good electrical conductivity along the pane and high mechanical strength. There is relatively weak bonding between the planes of carbon in graphite, so the sheets are susceptible to exfoliation, i.e., shearing to separate the layers from each other. Graphene sheets formally may refer to a single carbon layer, which can be somewhat unstable in isolated form with respect to curving and other deformations. For the purposes herein, a sheet with a few atomic layers of graphitic carbon may accomplish similar properties of stabilization of the silicon materials, so that a rigid reference to an ideal graphene sheet is not particularly relevant. For example, two layers of graphitic carbon may not be distinguishable easily in micrographs from a single layer. However, the graphitic x-ray diffraction peaks are observed to go away with the observation in TEM micrographs if graphene sheets are formed in the milling Examination of TEM micrographs can be difficult to interpret in terms of evaluating thickness of graphitic sheets, but the disappearance of the x-ray scattering peaks are consistent with graphene sheets to be 1 or a few layers. For the purposes herein, graphene sheet is used to refer to graphitic carbon having a thickness from 1 to 7 layers that do not diffract x-rays with a graphitic carbon peak, which is formed from stacked graphitic carbon layers. In the composite materials, the graphitic carbon may be in a distribution of thicknesses. Under the reasonable balancing of processing conditions described herein, generally a significant fraction but not all of the graphite is converted to graphene sheets, as demonstrated by a reduction in the graphite x-ray scattering peak.

The mechanical processing, which may include chemical reduction, of silicon suboxide can form a high capacity material, such as nanoscale crystalline silicon in nanoparticles and/or in nanoscale domains or multidomain particles, but as described below the precise nature of the material may not be clear. The exfoliated graphene sheets can form an electrically conductive matrix that is believed to facilitate structural accommodation of the volume changes associated with lithium uptake and release from silicon and silicon suboxides. A range of useful composite materials can be formed, and the design of the composite can be characterized with respect to balance with respect to the nature of the composite constituent, and the control of the milling process to achieve the balance of composite composition is described further below.

The product material can be described in terms of the surface area, visible morphology in micrographs, elemental analysis by energy dispersive X-ray spectroscopy in conjunction with transmission electron microscopy, and x-ray diffraction. However, as noted above, certain characteristics of the material cannot be directly measured. Therefore, the electrochemical characterization can provide valuable information on the compositions in conjunction with other characterization tools. In the first milling step, the product material can be characterized by a surface area, average particle size and the identification of crystalline silicon identifiable from x-ray diffraction. In general, a surface area can be at least about 2.5 $m^2/g$ and the average secondary particle size (D50) can be no more than about 4 microns. With respect to silicon x-ray peaks, good battery results have been obtained with no identifiable Si scattering peak and with sizeable crystalline Si scattering peaks. There can be a balance of capacity versus cycling stability, and further stabilization of the materials in the future can influence the selected balance of the material properties. In any case, it is believed that modification of the starting silicon suboxide is significant regardless of whether or not crystalline x-ray diffraction peaks are visible, so ending milling with a degree of modification, which may or may not involve overall chemical reduction, somewhat short of producing crystalline Si scattering peaks is observed to produce a product material that has comparable reversible specific capacity cycled against lithium metal as samples with strong crystalline Si x-ray scattering peaks.

Upon incorporation into a composite material, the graphene/graphite materials can be effective to stabilize the composite material with respect to electrochemical cycling with incorporation and release of lithium at relatively low concentrations. The carbon component adds weight with at most a small contribution to the capacity. In general, the composite material comprises from about 0.5 weight percent to about 20 weight percent graphitic carbon, e.g., graphite and/or graphene. As noted below, the oxidation state of the processed silicon suboxide may or may not be well known, but the material nevertheless is well characterized overall.

The second milling step results in a material with a significant increased surface area that is believed to be associated with exfoliation of the graphite into graphene sheets, and the surface area generally is at least about 12 $m^2/g$. Average secondary particle size measurements generally decrease with additional milling and can be generally from about 5 microns to 500 nanometers.

Two sequential milling steps can be performed to synthesize a desirable processed silicon suboxide-graphitic carbon composites. During the first milling step, silicon suboxide is chemically altered, although it is not know if the material overall is reduced or if the microscopic domain structure becomes segregated into more active elemental silicon domains while other domains become more oxidized. If sufficient processing, generally through high energy mechanical milling, is performed, crystalline silicon x-ray diffraction can be observed, but lesser degrees of processing can be sufficient to obtain desired degrees of lithium intercalation/alloying capacity. Improved milling of silicon suboxide described herein provides for the in situ synthesis of processed silicon oxide with little or no contamination from the milling medium, e.g., zirconia, to generate a high capacity material. While significant amounts of small silicon crystallites can be formed in a composite material with the processed silicon suboxide, the degree of processing of the silicon suboxide can be tuned to yield desirable properties. In particular, while processing can increase the amount of crystalline nanoscale elemental silicon, improved cycling may result from more mild processing of the silicon suboxide. The surface area increases from the milling.

While the growth of x-ray diffraction peaks corresponding to crystalline silicon can both confirm the modification of silicon suboxide as well as provide information on the degree of modification, an extrapolation of the processing conditions and the observation of consistent electrochemical performance make it clear that significant modification of silicon suboxide takes place even if crystalline silicon x-ray diffraction is not observed. If no crystalline silicon is directly observed, the electrochemical data in view of the processing is a reasonable way to consider the degree of the modification of the silicon suboxide as a result of the processing. Under conditions for the modification of silicon suboxide without observable crystalline silicon peaks, it is not known if the processing forms small domains of either crystalline or amorphous Si that are too small to defract x-rays. To cover the range of compositions resulting from the processing of silicon suboxide, the material is referred to herein as processed silicon suboxide, whether or not visible crystalline Si x-ray scattering peaks are observed. The milling also reduces the overall particulate size and correspondingly increases the surface area. The processed silicon suboxide imparts a significant specific capacity with respect to lithium uptake and release for the product material. Improvements in the milling of silicon suboxide provide for greater modification of the silicon suboxide with reduced contamination of the milling media in comparison with results presented by the Deng application cited above.

During the second milling step, milling of the processed silicon suboxide material with graphite forms graphene sheets that provide a desirable degree of stabilization of the resulting ultimate composite material. In particular, particles of processed silicon suboxide are embedded between graphene sheets as a result of the high energy milling process. The degree of exfoliation of the graphic can be controlled during processing conditions. An intermediate degree of processing has been found to result in a composite with significantly greater stability. Overall, the two step processing is found to produce composite materials that have not been achieved with single step processing suggesting that the environment during the high energy milling significantly influences the chemical and structural transformations that occur within the complex composite material.

It has been discovered that balance with respect to both milling steps can be effective to obtain particularly desirable materials, although a range of product composite materials can yield very good electrochemical properties. With respect to the first milling step, the degree of processing of the silicon suboxide, which may or may not results in identifiable crystalline silicon, can be controlled based on the x-ray diffraction spectrum or extrapolation under milder milling conditions and/or a study of the electrochemical properties of the product material. While it may seem desirable to increase the amount of in situ nanoscale elemental silicon from a capacity perspective, high capacities can be obtained with milder processing of the silicon suboxide, and good cycling can similarly be obtained with the milder processing of silicon suboxide. Thus, the selection of the amount of crystalline nanoscale silicon can be adjusted with these issues to guide the processing design. While the product processed silicon suboxide-graphitic carbon composite can have a prominent crystalline silicon x-ray scattering peak, such a prominent peak may or may not be observed for some desirable battery materials. Also, the second milling step similarly can involve balance. Although increased milling of the blend comprising graphite is observed to increase exfoliation of the graphite into graphene, excessive milling seems to adversely influence the silicon based active phases of the materials. Similarly, while formation of graphene sheets seem desirable for stabilization based on the data herein, it is not currently clear whether or not maintenance of some graphite itself is or is not desirable.

The processed silicon suboxide-graphitic carbon composites comprise a selected relative amount of silicon and graphitic carbon with a corresponding amount of processing to provide compositions with desired properties. The relative amounts of silicon and graphite are determined by the starting materials for the second milling step. In general, a relatively low amount of graphitic carbon can be included in the composite to provide the electrochemical stabilization. The electrochemical capacity generally is determined primarily by the silicon component of the material. The processing conditions can be used independently to control the degree of silicon suboxide modification and the degree of graphite exfoliation. Processing parameters also control the surface area and particle size of the product material. The product material exhibits excellent cycling at a relatively high specific capacity.

In general, the milling process can comprise an approach that provides desired milling forces to modify silicon oxide in the first processing step and exfoliate graphite in the second processing step, such as jar milling and/or ball milling, such as planetary ball milling. Ball milling and similarly jar milling can involve grinding using a grinding medium, which can then be substantially removed from the ground material. A planetary ball mill is a type of ball milling in which the mill comprises a sun-wheel, at least one grinding jar mounted eccentrically on the sun-wheel, and a plurality of mixing balls within the grinding jar. In operation, the grinding jar rotates about its own axis and in the opposite direction around the common axis of the sun-wheel. The milling settings can be selected based on the particular milling configuration, such as the size of the milling jar and milling medium, which have been found to influence the forces delivered to the processing compositions. Also, suitable milling may be wet milling or dry milling. As noted above, the design of the product material can involve a balance of considerations, and correspondingly, the milling can involve a corresponding balance and generally not application of the greatest amount of milling force for the longest amount of time.

Battery Structure

In general, the lithium ion battery described herein comprises a positive electrode comprising a lithium intercalation material and a negative electrode comprising a lithium intercalation/alloying material, such as the processed silicon suboxide-graphitic carbon composites described herein. The nature of the positive electrode active material and the negative electrode active material influences the resulting voltage of the battery since the voltage is the difference between the half cell potentials at the cathode and anode. As described in detail below with respect to specific battery designs, the batteries generally have a positive electrode or cathode, a negative electrode or anode with a separator layer between the positive electrode and negative electrode, separate current collectors associated with the respective electrodes, electrolyte for ion mobility and a container. For larger capacity secondary batteries, an electrode stack with a plurality of electrodes of each polarity are generally assembled in a stack.

Suitable positive electrode active materials are described below, and the materials of particular interest are lithium metal oxides. Generally, suitable negative electrode lithium intercalation/alloying compositions can include, for example, graphite, synthetic graphite, coke, fullerenes, other graphitic carbons, niobium pentoxide, tin alloys, silicon, silicon alloys, silicon-based composites, titanium oxide, tin oxide, and lithium titanium oxide, such as $Li_xTiO_2$, $0.5<x\le1$ or $Li_{1+x}Ti_{2-x}O_4$, $0\le x\le\frac{1}{3}$. However, as described herein, improved negative electrode active materials generally comprise high capacity silicon-based materials, which can comprise processed silicon suboxide-graphitic carbon composite material. Silicon based active materials take up lithium to form an alloy and release lithium from the alloy to correspondingly release lithium, and have a relatively low potential relative to lithium such that they can be substituted for lithium without dramatic changes in voltage of the resulting battery in comparison with a corresponding battery with a lithium metal negative electrode. Negative electrode active materials of particular interest are described in detail below.

The positive electrode active compositions and negative electrode active compositions generally are powder compositions that are held together in the respective electrode with a polymer binder. The binder allows for ionic conductivity to the active particles when in contact with the electrolyte. Suitable polymer binders include, for example, polyvinylidine fluoride (PVDF), polyethylene oxide, polyimide, polyethylene, polypropylene, polytetrafluoroethylene, polyacrylates, rubbers, e.g. ethylene-propylene-diene monomer (EPDM) rubber or styrene butadiene rubber (SBR), copolymers thereof, or mixtures thereof. In particular, thermally curable polyimide polymers have been found desirable for high capacity silicon-based electrodes, which may be due to their high mechanical strength. The following Table 1 provides suppliers of polyimide polymers, and names of corresponding polyimide polymers.

TABLE 1

| Supplier | Binder |
| --- | --- |
| New Japan Chemical Co., Ltd. | Rikacoat PN-20; Rikacoat EN-20; Rikacoat SN-20 |
| HD MicroSystems | PI-2525; PI-2555; PI-2556; PI-2574 |
| AZ Electronic Materials | PBI MRS0810H |
| Ube Industries. Ltd. | U-Varnish S; U-Varnish A |
| Maruzen petrochemical Co., Ltd. | Bani-X (Bis-allyl-nadi-imide) |
| Toyobo Co., Ltd. | Vyromax HR16NN |

With respect to polymer properties, some significant properties for electrode application are summarized in the following Table 2.

TABLE 2

| Binder | Elongation | Tensile Strength (MPa) | Elastic Modulus | Viscosity (P) |
| --- | --- | --- | --- | --- |
| PVDF | 5-20% | 31-43 | 160000 psi | 10-40 |
| Polyimide | 70-100% | 150-300 | | 40-60 |
| CMC | 30-40% | 10-15 | | 30 |

PVDF refers to polyvinylidene fluoride, and CMC refers to sodium carboxy methyl cellulose. The elongation refers to the percent elongation prior to tearing of the polymer. In general, to accommodate the silicon based materials, it is desirable to have an elongation of at least about 50% and in further embodiments at least about 70%. Similarly, it is desirable for the polymer binder to have a tensile strength of at least about 100 MPa and in further embodiments at least about 150 MPa. Tensile strengths can be measured according to procedures in ASTM D638-10 Standard Test Method for Tensile Properties of Plastics, incorporated herein by reference. A person of ordinary skill in the art will recognize that additional ranges of polymer properties within the explicit ranges above are contemplated and are within the present disclosure. The particle loading in the binder can be large, such as greater than about 80 weight percent. To form the electrode, the powders can be blended with the polymer in a suitable liquid, such as a solvent for the polymer. The resulting paste can be pressed into the electrode structure.

The active particle loading in the binder can be large, such as greater than about 80 weight percent, in further embodiments at least about 83 weight percent and in other embodiments from about 85 to about 97 weight percent active material. A person of ordinary skill in the art will recognize that additional ranges of particles loadings within the explicit ranges above are contemplated and are within the present disclosure. To form the electrode, the powders can be blended with the polymer binder in a suitable liquid, such as a solvent for the polymer binder. The resulting paste can be pressed into the electrode structure.

The positive electrode composition, and in some embodiments the negative electrode composition, generally can also comprise an electrically conductive powder distinct from the electroactive composition. Suitable supplemental electrically conductive powders include, for example, graphite, carbon black, metal powders, such as silver powders, metal fibers, such as stainless steel fibers, and the like, and combinations thereof. Generally, an electrode can comprise from about 1 weight percent to about 25 weight percent, and in further embodiments from about 2 weight percent to about 20 weight percent and in other embodiments from about 3 weight percent to about 15 weight percent distinct electrically conductive powder. A person of ordinary skill in the art will recognize that additional ranges of amounts of electrically conductive powders within the explicit ranges above are contemplated and are within the present disclosure. Specific electrically conductive materials for high capacity negative electrodes are described further below.

Each electrode generally is associated with an electrically conductive current collector to facilitate the flow of electrons between the electrode and an exterior circuit. A current collector can comprise a metal structure, such as a metal foil or a metal grid. In some embodiments, a current collector can be formed from nickel, aluminum, stainless steel, copper or the like. An electrode material can be cast as a thin film onto a current collector. The electrode material with the current collector can then be dried, for example in an oven, to remove solvent from the electrode. In some embodiments, a dried electrode material in contact with a current collector foil or other structure can be subjected to a pressure from about 2 to about 10 kg/cm$^2$ (kilograms per square centimeter).

The separator is located between the positive electrode and the negative electrode. The separator is electrically insulating while providing for at least selected ion conduction between the two electrodes. A variety of materials can be used as separators. Commercial separator materials can be formed from polymers, such as polyethylene and/or polypropylene that are porous sheets that provide for ionic conduction. Commercial polymer separators include, for example, the Celgard® line of separator material from Hoechst Celanese, Charlotte, N.C. Suitable separator materials include, for example, 12 micron to 40 micron thick trilayer polypropylene-polyethylene-polypropylene sheets, such as Celgard® M824, which has a thickness of 12 microns. Also, ceramic-polymer composite materials have been developed for separator applications. These composite separators can be stable at higher temperatures, and the composite materials can significantly reduce the fire risk. Polymer-ceramic composites for lithium ion battery separators are sold under the trademark Separion® by Evonik Industries, Germany.

The electrolyte provides for ion transport between the anode and cathode of the battery during the charge and discharge processes. We refer to solutions comprising solvated ions as electrolytes, and ionic compositions that dissolve to form solvated ions in appropriate liquids are referred to as electrolyte salts. At least some of the irreversible capacity loss can be attributed to the formation of a solvent electrolyte interphase layer associated with the electrodes, and in particular with the negative electrode. Electrolytes for lithium ion batteries can comprise one or more selected lithium salts. Suitable lithium salts include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl)methide, lithium tetrafluoroborate, lithium perchlorate, lithium tetrachloroaluminate, lithium chloride, lithium difluoro oxalato borate, and combinations thereof. Traditionally, the electrolyte comprises a 1 M concentration of the lithium salts, although greater or lesser concentrations can be used. For lithium ion batteries of interest, a non-aqueous liquid is generally used to dissolve the lithium salt(s). The solvent generally does not dissolve the electroactive materials. Appropriate solvents include, for example, propylene carbonate, dimethyl carbonate, diethyl carbonate, 2-methyl tetrahydrofuran, dioxolane, tetrahydrofuran, methyl ethyl carbonate, γ-butyrolactone, dimethyl sulfoxide, acetonitrile, formamide, dimethyl formamide, triglyme (tri(ethylene glycol)dimethyl ether), diglyme (diethylene glycol dimethyl ether), DME (glyme or 1,2-dimethyloxyethane or ethylene glycol dimethyl ether), nitromethane and mixtures thereof. Particularly useful solvents for high voltage lithium-ion batteries are described further in published U.S. patent applications 2011/0136019 to Amiruddin et al. entitled: "Lithium ion battery with high voltage electrolytes and additives", incorporated herein by reference.

The porous silicon based material described herein can be incorporated into various commercial battery designs such as prismatic shaped batteries, wound cylindrical batteries, coin cell batteries, or other reasonable battery shapes. The batteries can comprise a single pair of electrodes or a plurality of pairs of electrodes assembled in parallel and/or series electrical connection(s). While the materials described herein can be used in batteries for primary, or single charge use, the resulting batteries generally have desirable cycling properties for secondary battery use over multiple cycling of the batteries.

In some embodiments, the positive electrode and negative electrode can be stacked with the separator between them, and the resulting stacked structure can be rolled into a cylindrical or prismatic configuration to form the battery structure. Appropriate electrically conductive tabs can be welded or the like to the current collectors and the resulting jellyroll structure can be placed into a metal canister or polymer package, with the negative tab and positive tab welded to appropriate external contacts. Electrolyte is added to the canister, and the canister is sealed to complete the battery. Some presently used rechargeable commercial batteries include, for example, the cylindrical 18650 batteries (18 mm in diameter and 65 mm long) and 26700 batteries (26 mm in diameter and 70 mm long), although other battery sizes can be used, as well as prismatic cells and foil pouch batteries of selected sizes.

Figure 1C:
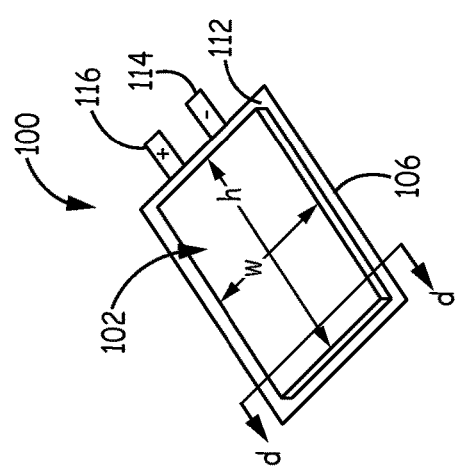
FIG. 1(c) is an illustration of a perspective view of the sealed battery of FIG. 1(b) with the pouch cover at the bottom.
Figure 1D:
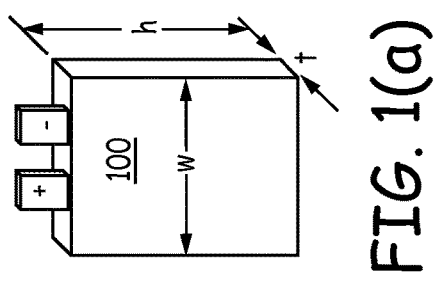
FIG. 1(d) is a sectional view of the battery of FIG. 1(c) viewed along the d-d line.
Figure 1B:
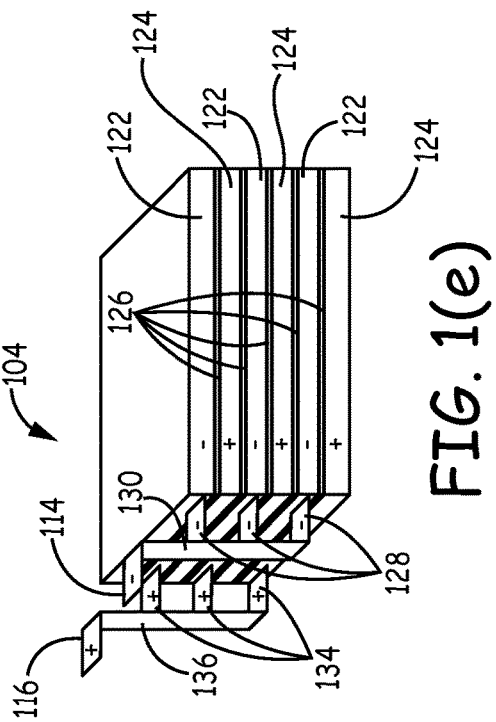
FIG. 1(b) is a schematic diagram of the pouch cell battery of FIG. 1(a) with the pouch enclosure, battery core, and pouch cover of the battery taken apart and illustrated separately.

Pouch cell batteries can be particularly desirable for vehicle applications due to stacking convenience and relatively low container weight. A representative embodiment of a pouch battery is shown in FIG. 1(a)-1(d). Specifically, pouch cell battery 100 as shown in FIG. 1(a) as a generally approximate rectangular parallelepiped, excluding the connection tabs and other potential features around the edges, characterized by a thickness (t) and a planar area with a width (w) and a height (h) in which the thickness is generally significantly less than the linear dimensions (width and height) defining the planar area (w·h). The pouch enclosure 102, battery core 104 and pouch cover 106 of the battery 100 is taken apart and illustrated in FIG. 1(b). As shown in FIG. 1{b}, terminal tabs 114, 116 extend outward from the battery core 104. Pouch enclosure 102 comprises a cavity 110 and edge 112 surrounding the cavity. Cavity 110 has dimensions such that battery core 104 can fit within cavity 110. Pouch cover 106 can seal around edge 112 to seal battery core 104 within the cavity 110 to form the sealed battery 100. FIG. 1(c) is an illustration of a perspective view of the sealed battery 100 with the pouch cover 106 at the bottom and the cavity 110 showing as protrusion from the pouch cover 106. Terminal tabs 114, 116 are shown extending outward from the sealed pouch for electrical contact. FIG. 1(d) is a schematic diagram of a cross section of the battery 100 viewed along the d-d line of FIG. 1(c). Specifically, battery core 104 is shown to be encased inside the cavity 110 of the pouch enclosure 102 sealed along the edge 112 with pouch cover 106. Many additional embodiments of pouch batteries are possible with different configurations of the edges and seals. However, reasonable configurations of the pouch batteries can take advantage of the desired design parameters described herein.

Figure 1E:
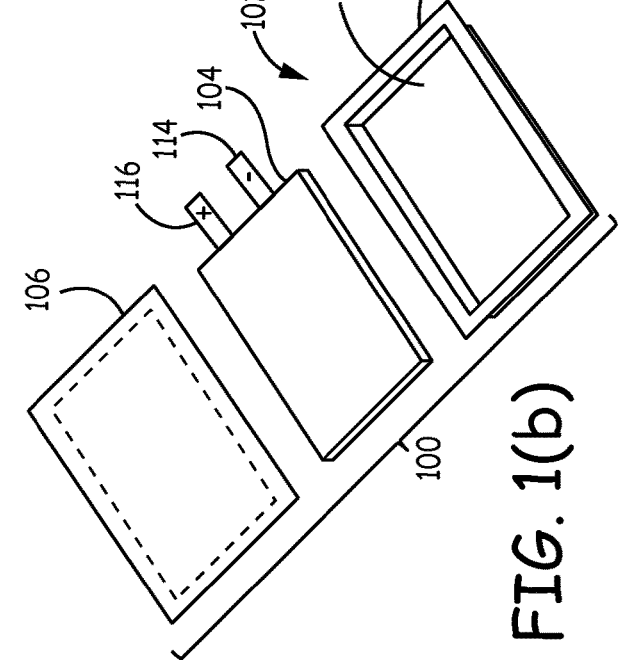
FIG. 1(e) is a schematic representative illustration of a battery core that comprises three negative electrode structures, three positive electrode structures, and five separators.

In the embodiments of particular interest herein, the electrodes are stacked in battery core 104 with a stack of positive electrodes 124 (cathodes) and negative electrodes 122 (anodes) with a sheet of separator 126 between adjacent electrodes of opposite parity, as shown in FIG. 1(e). For secondary batteries designed to operate at reasonable rates for most applications, it has been found that the electrodes perform appropriately if they are not too thick, and anode loading levels are explored in the examples. Appropriate electrically conductive tabs can be welded or the like to the current collectors to form current collector tabs. Referring to FIG. 1(e), electrically conductive tabs 134 are electrically connected with positive electrodes 124 and electrically conductive tabs 128 are electrically connected with negative electrodes 126. Generally, the electrode plates in the stack of like polarity are connected in parallel. In other words, current collector tabs of the positive electrodes are connected, e.g., welded or the like, to a common electrical conductive element, and the current collector tabs of the negative electrodes are connected to a common electrical conductive element. Referring to FIG. 1(e), current collector 136 is electrically connected with electrically conductive tabs 134 and currently collector 130 is electrically connected with electrically conductive tabs 128. Current collectors 130,136 are respectively terminated with negative terminal tab 114 and positive terminal tab 116. Suitable electrically conductive elements include, for example, a metal strip, wire or the like. With a parallel connection, the capacity of the battery is the sum of the capacities available from the individual electrodes. The battery core can be placed into the pouch, with the negative terminal tab 114 and the positive terminal tab 116 extending from the pouch packaging material to provide connection to appropriate external contacts, as indicated in FIG. 1(e). Electrolyte is added to the pouch, and the pouch is sealed to complete the battery.

A desirable pouch battery design for vehicle batteries incorporating a high capacity cathode active materials is described in detail in published U.S. patent applications 2009/0263707 to Buckley et al, entitled "High Energy Lithium Ion Secondary Batteries," incorporated herein by reference. Specific designs for batteries for vehicle use incorporating high capacity positive electrode active material and negative electrode active material are described in detail in copending U.S. patent application Ser. No. 13/777, 722 to Masarapu et al., entitled "Battery Designs With High Capacity Anode Materials and Cathode Materials," and copending U.S. patent application Ser. No. 13/464,034 to Masarapu et al. (the '672 application), entitled "Battery Cell Engineering and Design to Reach High Energy," both incorporated herein by reference.

Composite Silicon Based Active Materials and Processing to Form the Materials

Composite materials comprise processed silicon suboxide to provide a high specific capacity and graphitic carbon with a graphene component to stabilize the silicon based material as well as increase electrical conductivity. The silicon suboxide component of the composite may or may not comprise measurable crystalline silicon. Two high energy milling steps can be used to form the desired composite compositions. In the first milling step, mechanical forces from the milling induce the modification of a silicon suboxide starting material. In the second milling step, the product of the first milling step is milled with a powder of graphite which results in the exfoliation of at least a portion of the graphite to form graphene. The graphene formation seems to be associated with significant stabilization of the resulting active material when cycled in a lithium based battery.

The relative amounts of processed silicon suboxide and graphitic carbon can be balanced to achieve desired levels of specific capacity and stability. In general, commercial battery grade graphite powder can be used as the graphite component added for the second high energy mechanical milling step. In general, natural graphite, synthetic graphite or a combination thereof can be used. The relative amounts of processed silicon suboxide and graphitic carbon are determined by the materials added into the second milling step, and it is assumed for the purpose of evaluating relative amounts of components that the masses of the components do not change as a result of the high energy mechanical milling process even though the form of the graphitic carbon changes. In general, a relatively low amount of graphitic carbon can be used to achieved desired results, and a corresponding relatively large proportion of silicon based active material can contribute to a correspondingly large specific capacity.

To the extent that a modest addition of silicon based active material can increase the capacity of the composite material, the composite can effectively comprise a wide range of graphite to form a desirable composite material. Thus, the composite material can comprise from about 0.5 weight percent graphitic carbon to about 95 weight percent graphitic carbon, in further embodiments from about 4 weight percent to about 90 weight percent, and in other embodiments from about 8 weight percent graphitic carbon to about 85 weight percent. In some embodiments, it is desirable to have a high specific capacity material with a more modest amount of graphite, so it is useful to consider ranges of composition accordingly in which the composite comprises. For some embodiments, the composite material can comprise from about 0.5 weight percent graphitic carbon to about 30 weight percent graphitic carbon, in further embodiments from about 1 weight percent to about 25 weight percent, in other embodiments from about 3 weight percent graphitic carbon to about 20 weight percent, and in additional embodiments from about 4 weight percent to about 15 weight percent graphitic carbon. A person of ordinary skill in the art will recognize that additional ranges of graphitic carbon concentrations within the explicit ranges above are contemplated and are within the present disclosure.

In some contexts, the term graphene has been used to refer to an ideal single layer of graphitic, i.e., an aromatic sheet, of carbon. In more commercial application contexts, graphene generally refers to exfoliated graphite generally with no more than about 7 layers, i.e., 1-7 layers, of graphitic carbon and possibly including a distribution of layer thicknesses as well as varying layer thickness across a particular sheet. It can be difficult to evaluate the thicknesses of graphene sheets in the context of a composite material, as in the present case. However, the graphene sheets can be observed in micrographs as thin structures, and the magnitude of the graphite x-ray diffraction peak is observed to diminish consistent with observations in micrographs of the exfoliation process. The degree of disappearance of the graphite x-ray diffraction peak can provide a measure of the degree of graphite exfoliation. The exfoliation of the graphite into graphene sheets also seems to be correlated with an increase in surface area of the product material, which is believed to be generally consistent with the formation of graphene sheets with a plurality of carbon layers since the surface area increases are significant but not large.

In some embodiments, composite materials with good stability and high discharge capacities are observed to have significant fractions of the graphite converted to graphene but with significant amounts of remaining graphite based on x-ray diffraction. With composite samples obtained in the Examples, the electrochemical capacity of the material decreased significantly with further high energy mechanical milling to exfoliate the graphite, but prior to conversion of all of the graphite to graphene, as evaluated by observation of the graphite x-ray diffraction. According to the data in the Examples below, the qualitative trend in the data indicates that significant graphene formation is associated with an increase in capacity and stabilization with cycling but that excessive exfoliation of graphene is associated with a drop in capacity and stabilization.

High energy mechanical milling can generally reduce the average secondary particle sizes. Secondary particles size refers to the particle size in a dispersion, and the secondary particle size can be measured by dynamic light scattering or the like. For convenience, volume average particle sizes are reported as $D_{50}$ values. Direct measurements by dynamic light scattering (DLS) are intensity weighted particle size distributions, and these can be converted to volume based distributions using conventional techniques. The volume-average particle size can be evaluated from the volume-based particle size distribution. Suitable particle size analyzers include, for example, a Microtrac UPA instrument from Honeywell and Saturn DigiSizer™ from Micromeritics based on dynamic light scattering, a Horiba Particle Size Analyzer from Horiba, Japan and ZetaSizer Series of instruments from Malvern based on Photon Correlation Spectroscopy. The principles of dynamic light scattering for particle size measurements in liquids are well established.

The formation of the composite through the exfoliation of the graphite increases the surface area of the material. In some embodiments, the processed silicon suboxide-graphitic carbon composite has a BET surface area from about 12 $m^2/g$ to about 35 $m^2/g$, in further embodiments from about 14 $m^2/g$ to about 33 $m^2/g$ and in further embodiments from about 15 $m^2/g$ to about 32 $m^2/g$. BET surface area can be measured using gas adsorption, for example, as measured with commercially available equipment, and Standards are available for basing these measurements, e.g., ASTM Standard C1274-12 "Standard Test Method for Advanced Ceramic Specific Surface Area by Physical Adsorption," incorporated herein by reference. The processed silicon suboxide-graphitic carbon composite can have a D50 volume average particle size of no more than about 10 microns, in further embodiments from about 0.75 microns to about 9 microns and in additional embodiments from about 0.8 microns to about 8 microns. A person if ordinary skill in the art will recognize that additional ranges of BET surface area and D50 volume average secondary particle sizes within the explicit ranges above are contemplated and are within the present disclosure. The secondary particle size distributions are observed to have a bimodal distribution.

The processed silicon suboxide material from the first high energy mechanical milling step is a starting material for the second high energy mechanical milling step, and the properties of the processed silicon suboxide can influence the properties of the ultimate composite. In its broadest sense, silicon suboxide can be written with a formula $SiO_x$, $0<x<2$. As described in the Examples below, the starting materials for the synthesis were commercial powders of SiO.

While metastable SiO has been reported in the gas phase, the solid can take on a complex material structure that is not necessarily stoichiometric. SiO can be formed with a high temperature reaction of Si and $SiO_2$. For use as an active material for a lithium ion battery, silicon suboxide generally refers to amorphous oxygen deficient silicon oxides represented by formula $SiO_x$ where $0.1 \le x \le 1.9$, in further embodiments 0.15≤x≤1.8, in other embodiments 0.2≤x≤1.6 and in additional embodiments 0.25≤x≤1.5. In some embodiments, x≈1 and the silicon oxide is represented approximately by formula SiO. A person of ordinary skill in the art will recognize that additional ranges of silicon oxide stoichiometry within the explicit ranges above are contemplated and are within the present disclosure.

In some embodiments, peaks corresponding to crystalline silicon can be observed with respect to the processed silicon suboxide material, but under lesser processing conditions a desirable level of specific capacity can be observed without necessarily seeing a visible x-ray diffraction peak corresponding to elemental silicon. Based on an extrapolation of the observations, it seems that a degree of modification of the material is taking place whether or not x-ray diffraction provides an evidence of elemental silicon generation. While the observation of crystalline silicon x-ray scattering peaks can provide direct evidence of material modification of the silicon suboxide, the observed degrees of specific capacity is essentially also diagnostic for the modification of the silicon, although less information is provided regarding the phase structure of the silicon material, which may likely be complex whether or not elemental silicon domains are manifested. Nevertheless, under appropriate processing conditions it seems fair to conclude that modification of the silicon suboxide takes place, and the HEMM milled materials are correspondingly referred to as processed silicon suboxides.

While the formation of elemental silicon may increase the specific capacity, larger quantities of elemental silicon can result in decreased cycling stability for the materials. Some elemental silicon was observed from processing of silicon suboxide in the Deng application cited above. In order to achieve desired degrees of cycling stability at a relatively high specific capacity, the degree of modification of the silicon suboxide through the milling process can be balanced to provide a desired performance of the materials. Generally, the processed silicon suboxide also has an increased surface area. In some embodiments, the BET surface area can be at least about 2 $m^2/g$, in further embodiments from about 2.5 $m^2/g$ to about 20 $m^2/g$ and in additional embodiments from about 3 $m^2/g$ to about 17 $m^2/g$. A person of ordinary skill in the art will recognize that additional ranges of surface area within the explicit ranges above are contemplated and are within the present disclosure.

The milling also decreases the average particle size of the processed silicon suboxide. The secondary particle size can be measured by dynamic light scattering of a dispersion in a suitable liquid. The volume based D50 values can be no more than about 10 microns and in further embodiments from about 0.3 microns to about 9 microns. A person of ordinary skill in the art will recognize that additional ranges of D50 values within the explicit ranges above are contemplated and are within the present disclosure.

The high energy mechanical milling generally involves jar milling and/or ball milling with a suitable mill, such as a planetary ball mill. Ball milling and similarly jar milling may involve grinding using a grinding medium, such as ceramic particles, which can then be substantially removed from the ground material. A planetary ball mill is a type of ball milling in which the mill comprises a sun-wheel, at least one grinding jar mounted eccentrically on the sun-wheel, and a plurality of mixing balls within the grinding jar. In operation, the grinding jar rotates about its own axis and in the opposite direction around the common axis of the sun-wheel. High energy mechanical milling can provide mechanical forces to induce significant structural changes to the milled material.

The high energy mechanical milling can be performed by dry milling with only particles of grinding media or wet milling with a liquid in addition to the particles of grinding media. Suitable liquids can include aqueous solvents, organic solvents, such as alcohols, or mixtures thereof. Ethanol, isopropanol or other low molecular weight alcohols can be convenient liquid media. The mill container can be filled with an inert gas, such as nitrogen or argon, to avoid oxidizing the contents of the container during milling. Examples of suitable grinding media include, for example, particles of zirconia, alumina, tungsten carbide, other dense ceramic compositions or the like. The milling media is generally chosen to be harder and denser than the materials being milled, and milling conditions an be selected to achieve little if any milling media contamination in the product material. The selection of the amount of milling media and size of milling balls can be selected to balance the energy of the milling process based on observed physical changes to the material.

Desirable ball milling rotation rates and ball milling times can be selected based on the desired composition and structure of the product materials. For the formation of processed silicon suboxide and corresponding composites with graphitic carbon, ball milling rotation rates generally can be from about 50 rpm to about 1000 rpm and in further embodiments from about 75 rpm to about 700 rpm. Furthermore, desirable ball milling times can be from about 10 minutes to about 20 hour and in further embodiments from about 20 minutes to about 10 hours. The weight ratio of milling media to material being milled is generally from about 1:1 to about 25:1 and in further embodiments from about 1.5:1 to about 15:1. A person of ordinary skill in the art will recognize that additional ranges of milling rates and times within the explicit ranges above are contemplated and are within the present disclosure. In general, the milling media particle sizes are much larger than the particle sizes of the material being milled, which allows for separation of the milling balls.

As noted above, the high energy milling to obtain the desired composite materials is performed in two steps, which leads to desired compositions with good electrochemical properties. In addition, each of the two milling steps is balanced to provide a composition with desirable performance properties. The first processing step is adjusted to provide the desired degree of silicon suboxide compositional modification as well as reduction of particle size and increase in surface area. While additional high energy mechanical milling of the silicon suboxide seems to increase the modification of the material to form nanoscale elemental silicon, the increased milling may adversely influence the cycling stability of the material.

For the second high energy milling step to form the composite material, the processed silicon suboxide is combined with powdered graphite. In the second milling step, the degree of graphite exfoliation, decrease in particle size and increase in surface area is balanced to provide a composite material with a high specific capacity and desired cycling stability. The graphite can be exfoliated during the second milling step to form graphene sheets. The exfoliation of the graphite can be tracked by the diminishment of the x-ray scattering associated with graphite and the observation of the appearance of graphene sheets in electron micrographs. Correspondingly, the surface area of the material increases, and the average secondary particle size decreases. Relative amounts of graphitic carbon and silicon based material can be balanced with too low quantities of graphitic carbon not improving stability sufficiently, but greater amounts of graphitic carbon may not further improve stability but may decrease specific capacity. Similarly, exfoliation of the graphite to form graphene stabilized the material up to a point, and evidence suggests that excessive exfoliation of the graphite does not further improve the stability and may decrease capacity and stability, perhaps due to damage of the structure of the silicon based active material. Again, appropriate balance of the processing conditions results in a desirable product composite material.

High Capacity Positive Electrode Active Materials

In general, positive electrode (cathode) active materials comprise a lithium intercalation material such as lithium metal oxides or lithium metal phosphates. Positive electrode active materials include, for example, as stoichiometric layered cathode materials with hexagonal lattice settings like $LiCoO_2$, $LiNiO_2$, $LiCo_{1/3}Mn_{1/3}Ni_{1/3}O_2$ or the like; cubic spinel cathode materials such as $LiMn_2O_4$, $Li_4Mn_5O_{17}$, or the like; olivine materials, such as $LiMPO_4$ (M=Fe, Co, Mn, combinations thereof and the like). Lithium rich positive electrode active materials are of interest due to their high capacity, such as layered cathode materials, e.g., $Li_{1+x}(NiCoMn)_{0.33-x}O_2$ (0≤x<0.3) systems; layered-layered composites, e.g., $xLi_2MnO_3\cdot(1-x)LiMO_2$ where M can be Ni, Co, Mn, combinations thereof and the like; and composite structures like layered-spinel structures such as $LiMn_2O_4\cdot LiMO_2$. In some embodiments, a lithium rich composition can be referenced relative to a composition $LiMO_2$, where M is one or more metals with an average oxidation state of +3.

In some embodiments, the lithium rich compositions can be represented approximately with a formula $Li_{1+x}M_{1-y}O_2$, where M represents one or more non-lithium metals and y is related to x based on the average valance of the metals. In layered-layered composite compositions, x is approximately equal to y. The additional lithium in the initial cathode material can provide to some degree corresponding additional active lithium for cycling that can increase the battery capacity for a given weight of cathode active material. In some embodiments, the additional lithium is accessed at higher voltages such that the initial charge takes place at a higher voltage to access the additional capacity.

Lithium rich positive electrode active materials of particular interest are represented approximately by a formula $$Li_{1+b}Ni_\alpha Mn_\beta Co_\gamma A_\delta O_{2-z}F_z,\qquad\text{Formula I}$$

where b ranges from about 0.05 to about 0.3, α ranges from about 0 to about 0.4, β ranges from about 0.2 to about 0.65, γ ranges from 0 to about 0.46, δ ranges from 0 to about 0.15 and z ranges from 0 to about 0.2 with the proviso that both α and β are not zero, and where A is a metal element different from Ni, Mn, Co, or a combination thereof. Element A and F (fluorine) are optional cation and anion dopants, respectively. Element A can be, for example Mg, Sr, Ba, Cd, Zn, Al, Ga, B, Zr, Ti, Ca, Ce, Y, Nb, Cr, Fe, V, Li or combinations thereof. A person of ordinary skill in the art will recognize that additional ranges of parameter values within the explicit compositional ranges above are contemplated and are within the present disclosure.

To simplify the following discussion in this section, the optional dopants are not discussed further except for under the context of the following referenced applications. The use of a fluorine dopant in lithium rich metal oxides to achieve improved performance is describe in published U.S. patent application 2010/0086854 to Kumar et al., entitled "Fluorine Doped Lithium Rich Metal Oxide Positive Electrode Battery Materials With High Specific Capacity and Corresponding Batteries," incorporated herein by reference. The specific performance properties obtained with +2 metal cation dopants, such as $Mg^{+2}$, are described in copending U.S. patent application Ser. No. 12/753,312 to Karthikeyan et al., entitled "Doped Positive Electrode Active Materials and Lithium Ion Secondary Batteries Constructed Therefrom," incorporated herein by reference.

The formulas presented herein for the positive electrode active materials are based on the molar quantities of starting materials in the synthesis, which can be accurately determined. With respect to the multiple metal cations, these are generally believed to be quantitatively incorporated into the final material with no known significant pathway resulting in the loss of the metals from the product compositions. Of course, many of the metals have multiple oxidation states, which are related to their activity with respect to the batteries. Due to the presence of the multiple oxidation states and multiple metals, the precise stoichiometry with respect to oxygen generally is only roughly estimated based on the crystal structure, electrochemical performance and proportions of reactant metals, as is conventional in the art. However, based on the crystal structure, the overall stoichiometry with respect to the oxygen is reasonably estimated. All of the protocols discussed in this paragraph and related issues herein are routine in the art and are the long established approaches with respect to these issues in the field.

The stoichiometric selection for the compositions can be based on some presumed relationships of the oxidation states of the metal ions in the composition. As an initial matter, if in Formula I above, b+α+β+γ+δ is approximately equal to 1, then the composition can be correspondingly approximately represented by a two component notation as:

$$xLi_2M'O_3\cdot(1-x)LiMO_2\qquad\text{Formula II}$$

where 0<x<1, M is one or more metal cations with an average valance of +3 with at least one cation being a Mn ion or a Ni ion and where M' is one or more metal cations with an average valance of +4. It is believed that the layered-layered composite crystal structure has a structure with the excess lithium supporting the formation of an alternative crystalline phase. For example, in some embodiments of lithium rich materials, a $Li_2MnO_3$ material may be structurally integrated with either a layered $LiMO_2$ component where M represents selected non-lithium metal elements or combinations thereof. These compositions are described generally, for example, in U.S. Pat. No. 6,680,143 to Thackeray et al., entitled "Lithium Metal Oxide Electrodes for Lithium Cells and Batteries," which is incorporated herein by reference.

Recently, it has been found that the performance properties of the positive electrode active materials can be engineered around the specific design of the composition stoichiometry. The positive electrode active materials of particular interest can be represented approximately in two component notation as:

$$xLi_2MnO_3\cdot(1-x)LiMO_2\qquad\text{Formula III}$$

where M is one or more metal elements with an average valance of +3 and with one of the metal elements being Mn and with another metal element being Ni and/or Co. In general, in Formula II and III above, the x is in the range of 0<x<1, but in some embodiments 0.03≤x≤0.6, in further embodiments 0.075≤x≤0.50, in additional embodiments 0.1≤x≤0.45, and in other embodiments 0.15≤x≤0.425. A person of ordinary skill in the art will recognize that additional ranges within the explicit ranges of parameter x above are contemplated and are within the present disclosure. In some embodiments, M in Formula III comprises manganese, nickel, cobalt or a combination thereof along with an optional dopant metal and can be written as $Ni_uMn_vCo_wA_y$, where A is a metal other than Ni, Mn or Co. Consequently Formula III now becomes:

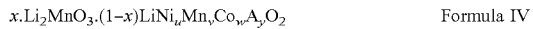
$$x.Li_2MnO_3.(1-x)LiNi_uMn_vCo_wA_yO_2 \quad \text{Formula IV}$$

where $u+v+w+y \approx 1$. While Mn, Co and Ni have multiple accessible oxidation states, which directly relates to their use in the active material, in these composite materials if appropriate amounts of these elements are present, it is thought that the elements can have the oxidation states $Mn^{+4}$, $Co^{+3}$ and $Ni^{+2}$. In the overall formula, the total amount of manganese has contributions from both constituents listed in the two component notation.

In some embodiments, the stoichiometric selection of the metal elements can be based on the above presumed oxidation states. Additionally, if $\delta=0$ in Formula I, the two component notation of Formula IV can simplify with $v \approx u$ to $x.Li_2MnO_3.(1-x)LiNi_uMn_uCo_wO_2$, with $2u+w=1$. Also, compositions can be considered in which the composition varies around the stoichiometry with $v \approx u$. The engineering of the composition to obtain desired battery performance properties is described further in U.S. Pat. No. 8,394,534 (the '534 patent) to Lopez et al., entitled "Layer-Layer Lithium Rich Complex Metal Oxides With High Specific Capacity and Excellent Cycling," incorporated herein by reference. Similar compositions have been described in U.S. Pat. No. 8,389,160 (the '160 patent) to Venkatachalam et al. entitled "Positive Electrode Material for Lithium Ion Batteries Having a High Specific Discharge Capacity and Processes for the Synthesis of these Materials", and published U.S. patent application 2010/0151332A (the '332 application) to Lopez et al. entitled "Positive Electrode Materials for High Discharge Capacity Lithium Ion Batteries", both incorporated herein by reference.

The positive electrode material can be advantageously synthesized by co-precipitation and sol-gel processes detailed in the '160 patent and the '332 application. In some embodiments, the positive electrode material is synthesized by precipitating a mixed metal hydroxide or carbonate composition from a solution comprising +2 cations wherein the hydroxide or carbonate composition has a selected composition. The metal hydroxide or carbonate precipitates are then subjected to one or more heat treatments to form a crystalline layered lithium metal oxide composition. A carbonate co-precipitation process described in the '332 application gave desired lithium rich metal oxide materials having cobalt in the composition and exhibiting the high specific capacity performance with superior tap density. The '160 patent and '332 application also describe the effective use of metal fluoride coatings to improve performance and cycling.

It is found that for many positive electrode active materials a coating on the material can improve the performance of the resulting batteries. Suitable coating materials, which are generally believed to be electrochemically inert during battery cycling, can comprise metal fluorides, metal oxides, metal non-fluoride halides or metal phosphates. The results in the Examples below are obtained with materials coated with metal fluorides.

For example, the general use of metal fluoride compositions as coatings for cathode active materials, specifically $LiCoO_2$ and $LiMn_2O_4$, is described in published PCT application WO 2006/109930A to Sun et al., entitled "Cathode Active Material Coated with Fluorine Compound for Lithium Secondary Batteries and Method for Preparing the Same," incorporated herein by reference. Improved metal fluoride coatings with appropriately engineered thicknesses are described in published U.S. patent application 2011/0111298 to Lopez et al, (the '298 application) entitled "Coated Positive Electrode Materials for Lithium Ion Batteries," incorporated herein by reference. Suitable metal oxide coatings are described further, for example, in published U.S. patent application 2011/0076556 to Karthikeyan et al. entitled "Metal Oxide Coated Positive Electrode Materials for Lithium-Based Batteries", incorporated herein by reference. The discovery of non-fluoride metal halides as desirable coatings for cathode active materials is described in published U.S. patent application 2012/0070725 to Venkatachalam et al., entitled "Metal Halide Coatings on Lithium Ion Battery Positive Electrode Materials and Corresponding Batteries," incorporated herein by reference. The synthesis approaches along with the coating provide for superior performance of the materials with respect to capacity as well as cycling properties. The desirable properties of the active material along with the use of desirable anode material described herein provide for improved battery performance.

Performance

The processed silicon suboxide-graphitic carbon composite materials can be effectively incorporated into silicon based batteries. To examine the general performance properties of the materials, electrodes formed with the composites can be assembled into a battery with lithium foil counter electrodes. In general though, the composites are particularly desirable with respect to use as a negative electrode in a lithium ion battery, for example, with a high capacity lithium rich metal oxide positive electrode active material. The general construction of lithium based batteries is outlines above, and specific testing batteries are described more specifically in the Examples below.

With respect to high capacity silicon based active materials, design of particular electrode parameters can be significant with respect to obtaining desirable performance parameters. The general principles of electrode design for high capacity silicon based materials has been elucidated as described in copending U.S. patent application Ser. No. 13/777,722 to Masarapu et al., entitled "Battery Designs With High Capacity Anode Materials and Cathode Materials," incorporated herein by reference. In general, with existing electrode designs to obtain good cycling, the density of the anode with respect to the active material is generally from about 0.4 g/cc (grams per cubic centimeter) to about 1.3 g/cc. Loading in an electrode relates to the total amount of active material, and the loading and density information correspondingly provide information on the electrode thickness. The results in the examples suggest that the high rate discharge capacities can be reduced for thicker electrodes, i.e., electrodes with a higher loading. In general, the loading levels can be at least about 1.5 mg/cm², in further embodiments from about 1.6 mg/cm² to about 5.5 mg/cm² and in some embodiments from about 1.8 mg/cm² to about 3.5 mg/cm². A person of ordinary skill in the art will recognize that additional ranges of electrode parameters within the explicit ranges above are contemplated and are within the present disclosure.

Electrodes formed with the silicon based materials can be tested against a lithium foil electrode to evaluate the capacity and the IRCL. Specifically, batteries assembled with a lithium foil electrode are cycled with the silicon based electrode functioning as a positive electrode (cathode) and the lithium foil functions as the negative electrode (anode). The batteries with a lithium foil electrode can be cycled over a voltage range, for example, from 0.005V to 1.5 V at room temperature. Alternatively, batteries can be formed with a positive electrode comprising a layered-layered lithium rich metal oxide in which the silicon oxide based electrode is then the negative electrode, and the battery can then be cycled between 4.5 volts and 1.0 volt at room temperature after initial activation in the first cycle, or another voltage window can be used. For the batteries with a lithium metal oxide-based positive electrode, the first cycle can be charged and discharged at a rate of C/20 and subsequent cycling can be at a rate of C/3 unless specified otherwise with charging at C/3, although other rates and variation of rates with cycle number can be selected for testing the battery performance. The specific discharge capacity is very dependent on the discharge rate. The notation C/x implies that the battery is discharged at a rate to fully discharge the battery to the selected voltage minimum in x hours.

For the batteries formed with a lithium metal oxide based positive electrode, the specific capacity of the battery can be evaluated against the weights of either anode active material or cathode active material, which involved division of the capacity by the respective weights. If supplemental lithium is included in the battery, the weight of the negative electrode active material can include the weight of the supplemental lithium since the supplemental lithium contributes to the negative electrode capacity. Using a high capacity positive electrode active material, the overall benefits of using a high capacity silicon oxide based negative electrode active material becomes even more beneficial. Based on the capacity of the battery, the specific capacities can be obtained by dividing the respective weight of the active materials in each electrode. It can be desirable to have high specific capacities for both electrodes.

In general, it can be desirable for the negative electrode to have a specific discharge capacity at a rate of C/20 that is at least about 800 mAh/g, in additional embodiments at least about 1200 mAh/g, in some embodiment at least about 1400 mAh/g, in other embodiments at least about 1500 mAh/g and in further embodiments at least about 1550 mAh/g at a rate of C/20 against lithium from 0.005V to 1.5V. When lithium is extracted from the silicon based composite against lithium an external voltage is applied, but this is termed discharge for consistency with corresponding capacities in a lithium ion battery. In some embodiments, the specific discharge capacity at the tenth cycle of at least about 700 mAh/g, in other embodiments at least about 1000 mAh/g, in other embodiments at least about 1250 mAh/g, in further embodiments at least about 1300 mAh/g, in some embodiments at least about 1350 mAh/g, in additional embodiments at least about 1375 mAh/g, and in some embodiments at least about 1400 mAh/g at a discharge rate of C/3 when cycled between 1.5V and 0.005V against a lithium counter electrode based on the anode active weight. Comparable specific capacities can be obtained in a lithium ion battery with a high capacity lithium rich metal oxide cycled between 4.5V and 1.0V. Depending on the specific silicon based active material, the lower voltage cutoff in the lithium ion battery can be selected to be 2.5V, 2.0V, 1.5V, 1.0V or 0.5V. In general, the lower voltage cutoff can be selected to extract a selected portion of the electrode capacity from about 92% to about 99%, and in further embodiments from about 95% to about 98% of the total capacity of the positive electrode. In some embodiments, particularly high values of specific capacity have been achieved with stable cycling to at least 300 cycles. In some embodiments, the material can exhibit a 50th cycle discharge capacity at a discharge rate of C/3 at least about 87% and in further embodiments at least about 90% of the 5th cycle discharge capacity when discharged from 1.5V to 0.005V at a rate of C/3 against a lithium metal counter electrode. A person of ordinary skill in the art will recognize that additional ranges of performance values within the explicit ranges above are contemplated and are within the present disclosure.

As noted above, it can be desirable to have a relatively high specific capacity for both electrodes when the positive electrode comprises a lithium rich metal oxide, and the battery can exhibit at a discharge rate of C/3 at the 50th cycle a positive electrode specific capacity of at least about 150 mAh/g and a negative electrode specific capacity of at least about 750 mAh/g, in further embodiments a positive electrode specific capacity of at least about 160 mAh/g and a negative electrode specific capacity of at least about 800 mAh/g, and in additional embodiments a positive electrode specific capacity of at least about 170 mAh/g and a negative electrode specific capacity of at least about 1000 mAh/g, when discharged between 4.5V and 1.0V. The batteries with lithium rich metal oxides and silicon oxide based materials can exhibit desirable cycling properties, and in particular the batteries can exhibit a discharge capacity decrease of no more than about 15 percent at the 50th discharge cycle relative to the 7th discharge cycle and in further embodiments no more than about 10 percent when discharged at a rate of C/3 from the 7th cycle to the 50th cycle. In some embodiments, the batteries further include supplemental lithium to reduce the irreversible capacity loss and to stabilize the cycling of lithium rich metal oxides.

EXAMPLES

To test various silicon based electrode compositions, batteries were constructed and tested. In some of the Examples, electrodes formed with the silicon based electrode composition were tested in batteries against lithium foil as the counter electrode. Other coin cell batteries were formed with high capacity positive electrodes with the high capacity silicon based electrodes at a selected electrode balance with supplemental lithium to compensate for at least some irreversible capacity loss. The general procedure for formation of the coin batteries is described in the following discussion. The batteries were cycled over a relevant voltage range to evaluate performance. The individual examples below describe formulation of a silicon based negative electrode active material, and the performance results from the batteries. The batteries with silicon based electrode described herein in general were cycled by charging from the open circuit voltage to 4.6V and discharging between 4.6V and 1.5V in the first formation cycle and between 4.5V and 1.5V for subsequent cycles in the cycle testing for batteries with high capacity manganese rich (HCMR®) positive counter electrode or between 0.005V and 1.5V for batteries with lithium foil counter electrode. With the lithium foil counter electrode used for testing purposes, the electrode with the silicon based material functions as the positive electrode for these batteries, but the electrode with the silicon based material may still be referred to as the "negative electrodes" for simplicity since in a commercial battery these electrodes would be used as negative electrodes with a lithium intercalation composition in the positive electrode. The batteries were discharged at a rate of C/20, C/10, C/5, and C/3 for the 1st and 2nd cycles, for the 3rd and 4th cycles, for the 5th and 6th cycles and for subsequent cycles, respectively. All percentages reported in the examples are weight percents unless explicitly indicated otherwise.

Electrodes formed with the silicon based material were formed from specific composite materials, which are described further below. In general, a powder of the silicon based composite active material, i.e., the processed silicon suboxide-graphitic carbon composite, was mixed thoroughly with an electrically conductive carbon additive, such as a blend of acetylene black (Super P® from Timcal, Ltd., Switzerland) with either graphite or carbon nanotubes, to form a homogeneous powder mixture. Separately, polyimide binder was mixed with N-methyl-pyrrolidone ("NMP") (Sigma-Aldrich) and stirred overnight to form a polyimide-NMP solution. The homogenous powder mixture was then added to the polyimide-NMP solution and mixed for about 2 hours to form homogeneous slurry. The slurry was applied onto a copper foil current collector to form a thin, wet film and the laminated current collector was dried in a vacuum oven to remove NMP and to cure the polymer. The laminated current collector was then pressed between rollers of a sheet mill to obtain a desired lamination thickness. The dried laminate contained at least 75 wt % processed silicon suboxide-graphitic carbon composite active material and at least 2 wt % polyimide binder. The resulting electrodes were assembled with either a lithium foil counter electrode or with a counter electrode comprising a lithium metal oxide (LMO), such as high capacity manganese rich (HCMR®) lithium metal oxide material as synthesized in the '160 patent, the '332 application, and the '534 patent referenced above.

The appropriate examples below use HCMR® positive material approximately described by the formula $xLi_2MnO_3 \cdot (1-x)LiNi_uMn_vCo_wO_2$ where $x=0.5$. The lithium rich positive electrode active materials are discussed in detail in the '534 patent cited above. The positive electrode active material had an $AlF_3$ protective nanocoating. Positive electrodes were formed from the synthesized HCMR® powder by initially mixing it thoroughly with conducting carbon black (Super P™ from Timcal, Ltd, Switzerland) and either graphite (KS 6™ from Timcal, Ltd) or carbon nanotubes to form a homogeneous powder mixture. Separately, Polyvinylidene fluoride PVDF (KF1300™ from Kureha Corp., Japan) was mixed with N-methyl-pyrrolidone (Sigma-Aldrich) and stirred overnight to form a PVDF-NMP solution. The homogeneous powder mixture was then added to the PVDF-NMP solution and mixed for about 2 hours to form homogeneous slurry. The slurry was applied onto an aluminum foil current collector to form a thin, wet film and the laminated current collector was dried in vacuum oven at 110° C. for about two hours to remove NMP. The laminated current collector was then pressed between rollers of a sheet mill to obtain a desired lamination thickness. The dried positive electrode comprised at least about 75 weight percent active metal oxide, at least about 1 weight percent graphite, and at least about 2 weight percent polymer binder. Positive electrodes using HCMR® positive electrode active material are generally referred to as HCMR® electrodes.

For batteries with the lithium foil counter electrodes, the electrodes were placed inside an argon filled glove box for the fabrication of the coin cell batteries. Lithium foil (FMC Lithium) having thickness of roughly 125 micron was used as a negative electrode. A conventional electrolyte comprising carbonate solvents, such as ethylene carbonate, diethyl carbonate and/or dimethyl carbonate, was used. A trilayer (polypropylene/polyethylene/polypropylene) micro-porous separator (2320 from Celgard, LLC, NC, USA) soaked with electrolyte was placed between the positive electrode and the negative electrode. Some additional electrolyte was added between the electrodes. The electrodes were then sealed inside a 2032 coin cell hardware (Hohsen Corp., Japan) using a crimping process to form a coin cell battery. The resulting coin cell batteries were tested with a Maccor cycle tester to obtain charge-discharge curve and cycling stability over a number of cycles. All batteries were electrochemically characterized in the range of 0.005 to 1.5V (2 cycles at C/20, 2 cycles at C/10, 2 cycles at C/5, the rest at C/3).

For batteries with the HCMR® counter electrodes, the silicon oxide based electrode and the HCMR® electrode were placed inside an argon filled glove box. An electrolyte was selected to be stable at high voltages, and appropriate electrolytes with halogenated carbonates, e.g., fluoroethylene carbonate are described in copending U.S. patent application Ser. No. 13/325,367 to Li et al., entitled "Low Temperature Electrolyte for High Capacity Lithium Ion Batteries," incorporated herein by reference. Based on these electrodes and the high voltage electrolyte, the coin cell batteries were completed with separator and hardware as described above for the batteries with the lithium foil electrode.

Some of the batteries fabricated from a silicon based negative electrode and a HCMR® positive electrode can further comprise supplemental lithium. In particular, a desired amount of SLMP® powder (FMC Corp., stabilized lithium metal powder) was loaded into a vial and the vial was then capped with a mesh comprising nylon or stainless steel with a mesh size between about 40 μm to about 80 μm. SLMP® (FMC corp.) was then deposited by shaking and/or tapping the loaded vial over a formed silicon based negative electrode. The coated silicon based negative electrode was then compressed to ensure mechanical stability.

Batteries fabricated from a silicon based negative electrode and a HCMR® positive electrode can be balanced to have excess negative electrode material. The balancing was based on the ratio of the first cycle lithium insertion capacity of the silicon based negative electrode to the total available lithium in the battery which is the sum of the oxidation capacity of the supplemental lithium and the theoretical capacity of the HCMR® positive electrode. In particular, for a given silicon based active composition, the insertion and extraction capacities of the silicon based composition can be evaluated in a battery setting. For example, a battery that has a positive electrode comprising the silicon based active material with a counter lithium foil negative electrode can be constructed. The insertion and extraction capacities of the silicon based composition in the electrode equals to the first cycle battery capacity measured when lithium is intercalated/alloyed to the silicon based electrode to 5 mV and de-intercalated/de-alloyed to 1.5V at a rate of C/20. For the full battery with the lithium metal oxide based positive electrode, values of the excess negative electrode balance are provided in the specific examples below. For batteries containing supplemental lithium, the amount of supplemental lithium was selected to approximately compensate for the irreversible capacity loss of the negative electrode.

Example 1—Formation of Processed Silicon Suboxide Composites

This Example demonstrates the effects of milling process parameters on the composition and structure of processed silicon suboxide composites formed by high energy milling of SiO with either wet milling or dry milling.

Figure 2:
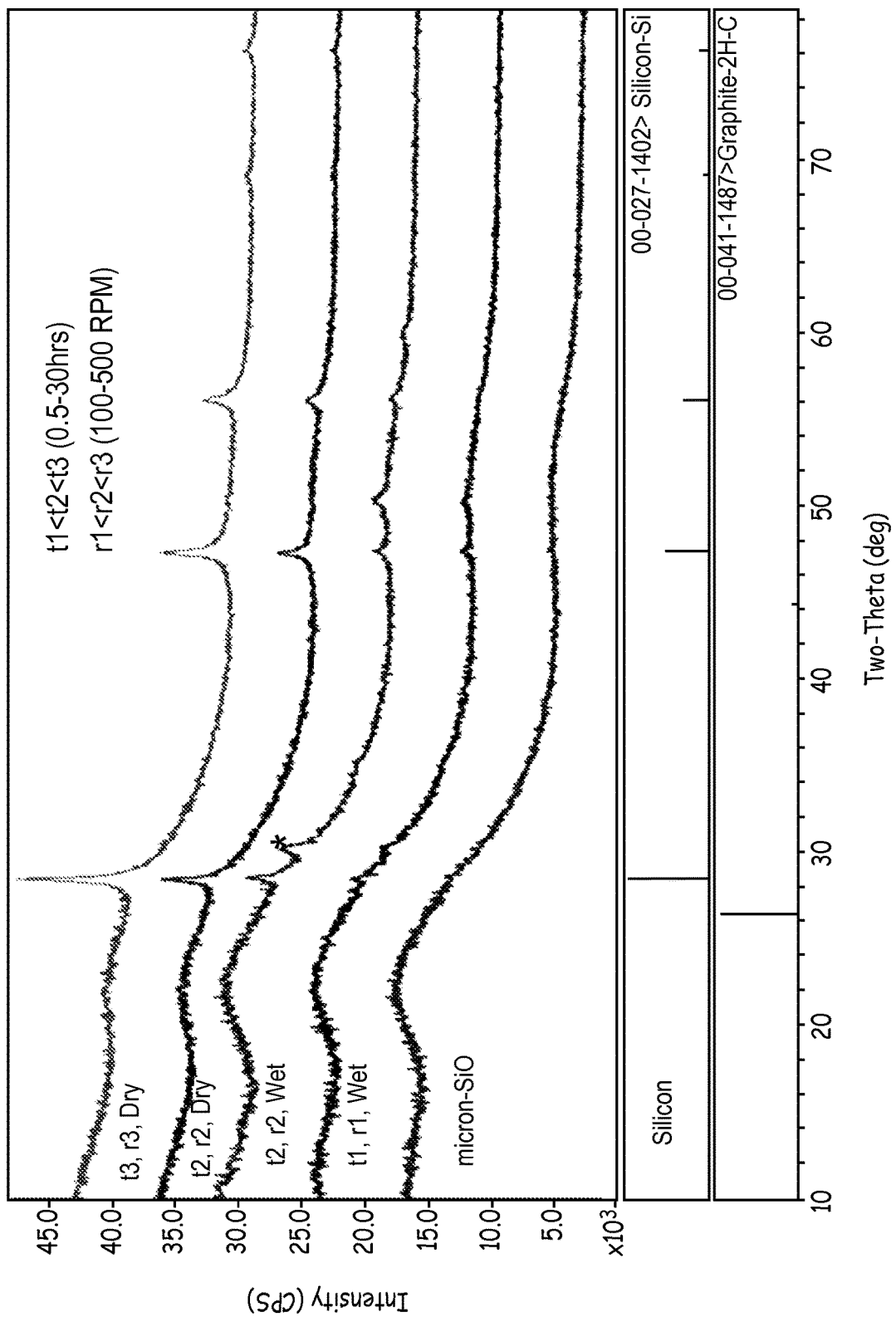
FIG. 2 is a graph displaying plots of scattering angle versus intensity obtained from X-ray diffraction analysis of silicon oxide particle powder and of processed silicon suboxide composites samples prepared with different milling parameters.

To demonstrate the effect of milling parameters on the composition of processed silicon suboxide composites, 4 samples (samples 1-4) were formed. For each sample, an appropriate amount of SiO powder (Sigma Aldrich) was added to a 500 ml zirconia jar along with zirconia milling balls. For samples 1 and 2, an appropriate amount of ethanol as a liquid media was also added to the zirconia jar. The jars were then sealed and placed into a high energy planetary ball mill. The SiO was milled at a speed of between about 150 rpm and about 400 rpm, and between about 1 hour and about 30 hours, with 1 hr≤$t_1$<$t_2$<$t_3$<$t_4$<$t_5$<$t_6$<$t_7$<$t_8$<$t_9$≤30 hrs. After milling, the wet samples were dried. X-ray diffraction (XRD) analysis was then performed on each of the 4 samples as well as on a reference sample of powdered SiO. FIG. 2 is a plot of the scattering angle versus intensity obtained by XRD analysis of each of the samples. The bottom panel of FIG. 2 shows an XRD plot of crystalline silicon. As used herein, a milling using liquid media is referred to as "wet" milling and a milling without using liquid media is referred to as "dry" milling.

FIG. 2 demonstrates that the presence and relative amount of crystalline silicon in the processed silicon suboxide composite formed during milling can be controlled by varying milling process parameters. With respect to milling time and speed, comparison of samples 1 and 2 (both wet) and samples 3 and 4 (both dry) demonstrate that increased milling speed and milling time resulted in a greater amount of crystalline formed during milling. With respect to milling type, comparison of the x-ray diffraction plots of sample 2 (wet) and sample 3 (dry) demonstrates that more elemental silicon was crystallized from the SiO matrix during the dry milling process relative to the wet milling process under similar milling conditions and that zirconia contamination from the milling balls was present in wet milled samples with significant amounts of crystalline silicon.

To examine the effect of processing parameters on the structure of processed silicon suboxide composites, 14 more samples (samples 5-18) were formed similarly as described above. The samples were wet milled or dry milled at a speed between about 200 rpm and about 350 rpm and for between about 1 hour and about 30 hours. After formation, the samples were then analyzed to determine the average surface area and volume average secondary particle size (D50). Surface areas were obtained from BET adsorption cross section measurements performed on the samples. Mean particles sizes were obtained from dynamic light scattering (DLS) measurements performed on the samples. A portion of dry sample powder was placed into the measuring device (Saturn Digisizer™, Micromeritics), which added isopropanol and sonicated to disperse the particles.

TABLE 3

| Sample Number | Milling Type | Speed (RPM) | Time (hours) | Surface Area ($m^2/g$) | D50 ($\mu m$) |
|---|---|---|---|---|---|
| 5 | Dry | 350 | $t_9$ | 13.5 | N/A |
| 6 | Dry | 350 | $t_8$ | 11.5 | 0.46 |
| 7 | Dry | 350 | $t_7$ | 11 | N/A |
| 8 | Dry | 350 | $t_5$ | 12.6 | N/A |
| 9 | Dry | 300 | $t_2$ | 9.2 | 1.83 |
| 10 | Dry | 300 | $t_4$ | 10.7 | 0.49 |
| 11 | Dry | 300 | $t_5$ | 14.7 | 0.49 |
| 12 | Dry | 300 | t6 | 14.4 | 0.44 |
| 13 | Wet | 300 | $t_1$ | 3.9 | 7.1 |
| 14 | Wet | 300 | $t_2$ | 4.8 | 6.6 |
| 15 | Wet | 300 | $t_4$ | 9.7 | 0.45 |
| 16 | Wet | 200 | $t_2$ | 1.6 | 8.8 |
| 17 | Wet | 200 | $t_3$ | 5.8 | 0.67 |
| 18 | Wet | 200 | $t_5$ | 6.2 | 0.64 |

The results presented in Table 3 demonstrate that, in general, longer milling times resulted in samples having smaller mean processed silicon suboxide particle sizes and larger surface areas. Comparison of dry milled samples 9-12 demonstrates that continued milling over time period greater than 2 hours reduced the mean processed silicon suboxide particle size from 1.83 μm to 0.44 μm and the surface area of the samples from 9.2 $m^2/g$ to 14.4 $m^2/g$. Likewise, comparison of wet milled samples 13-15 demonstrates that continued milling over time period greater than an hour reduced the mean processed silicon suboxide particle size from 7.1 μm to 0.45 μm and increased the surface area of the samples from 3.9 $m^2/g$ to 9.7 $m^2/g$. Similarly, comparison of wet milled samples 16-18 demonstrates that continued milling over time period greater than 2 hours reduced the mean processed silicon suboxide particle size from 8.8 μm to 0.64 μm and increased the surface are of the samples from 1.6 $m^2/g$ to 6.2 $m^2/g$.

The results in Table 3 also demonstrate that increased milling rate resulted in samples having a larger surface area. Comparison of dry samples 8 and 11 demonstrates that increasing the milling rate from 300 (sample 11) rpm to 350 rpm (sample 8) decreased the surface area the samples from 14.7 $m^2/g$ (sample 11) to 12.6 $m^2/g$ (sample 8). Similarly, comparison of wet samples 14 and 16 demonstrates that increasing the milling rate from 200 rpm (sample 16) to 300 rpm (sample 14) increased the surface area of the samples from 1.6 $m^2/g$ (sample 16) to 4.8 $m^2/g$ (sample 14).

With respect to milling type, the results tabulated in Table 3 indicate that wet milling resulted in samples having a smaller surface area. Comparison of samples 9 (dry) and 14 (wet) demonstrate that wet milling reduced the surface area from 9.2 $m^2/g$ (sample 9) to 4.8 $m^2/g$ (wet) and comparison of samples 10 (dry) and 15 (wet) demonstrate that wet milling reduced the surface area from 10.7 $m^2/g$ (sample 10) to 9.7 $m^2/g$ (sample 15). However, with respect to mean processed silicon suboxide particle size, no definitive trend was observed for the samples tested. In particular, comparison of samples 9 and 14 demonstrates that wet milling increased the mean particle size from 1.83 μm (sample 9) to 6.2 μm (sample 14) and comparison of samples 10 and 15 demonstrates that wet milling slightly decreased the mean particle size from 0.49 μm (sample 10) to 0.45 μm (sample 15). In comparing the surface area and particles sizes for wet milling and dry milling, dry milling resulted in higher values of surface area for similar D50 particle sizes, suggesting that the dry milled materials are more porous.

Example 2—Effect of Milling Parameters on the Composition and Structure of Processed Silicon Suboxide-Graphitic Carbon Composites This Example demonstrates the effects of milling parameters on the composition and structure of processed silicon suboxide-graphitic carbon composites. A first set of results is presented which demonstrates the effects of milling time on the composition of processed silicon suboxide-graphitic carbon composites. A second set of results in then presented demonstrating the effects of various milling parameters, including milling time, on the structure of processed silicon suboxide-graphitic carbon composites. This Example further demonstrates the formation of graphene sheets within composites formed from the milling of the processed silicon suboxide with graphitic carbon.

Figure 3:
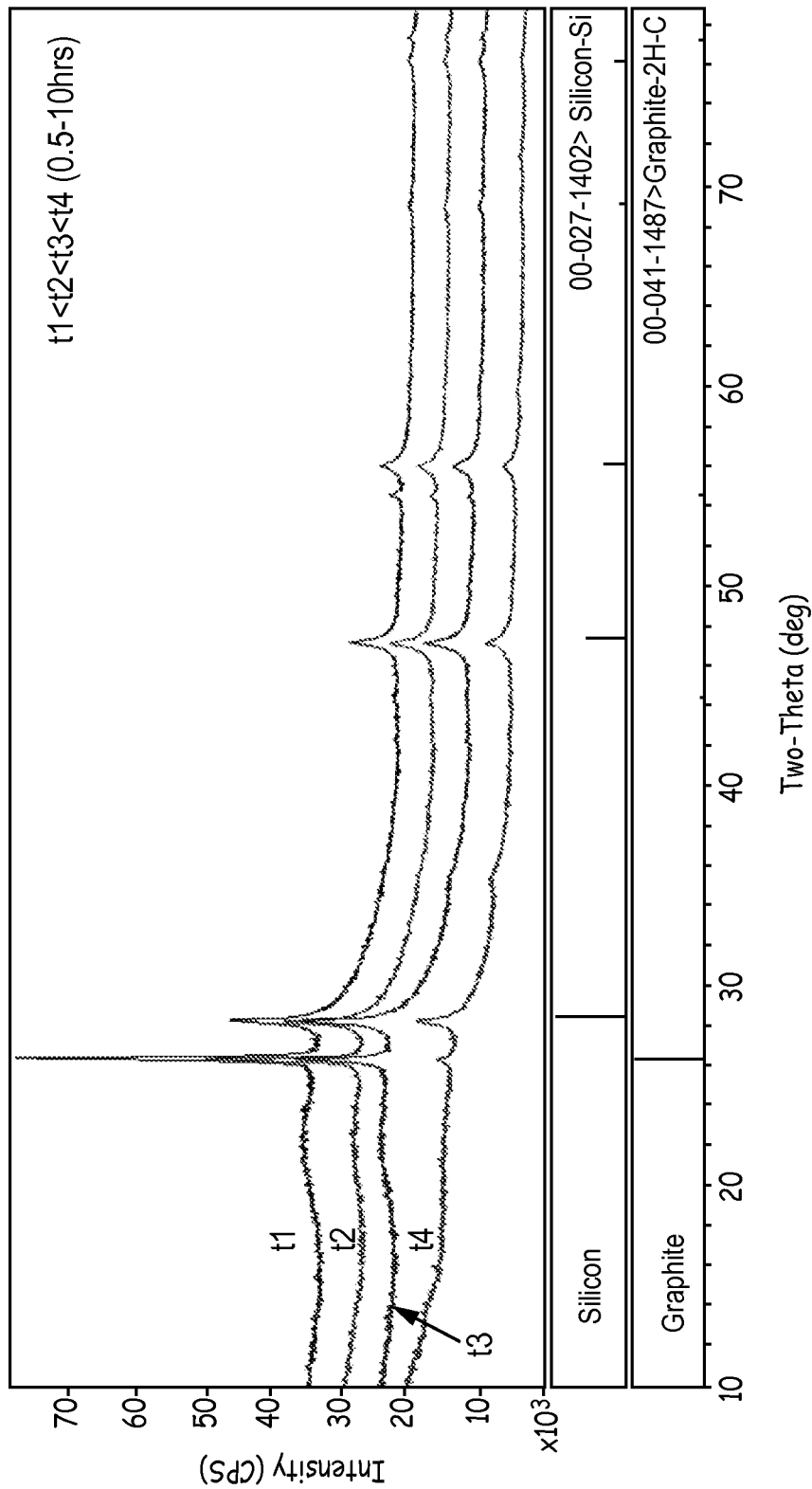
FIG. 3 is a graph displaying plots of scattering angle versus intensity obtained from X-ray diffraction analysis of graphite (lower panel), silicon (middle panel) and processed silicon suboxide-graphitic carbon composites prepared with different milling times (top panel).

To demonstrate the effect of milling time on composition, 4 samples (samples 23-26 of Table 3) were analyzed by x-ray diffraction. FIG. 3 is a graph showing plots of scattering angle versus intensity obtained from XRD analysis of samples 23-26. The lower two panels of FIG. 3 display the XRD spectra for silicon and graphite. FIG. 3 demonstrates that samples having longer milling times had lesser amounts of graphite, suggesting that longer milling times resulted in larger amounts of graphite being converted to graphene. Also, longer milling times seems to result in the loss of crystalline silicon while some graphite remained, while shorter milling time did not seem to change the amount of crystalline silicon. The results suggest that excessive milling to convert more graphite to graphene can alter silicon active phase in a possibly adverse way.

To demonstrate the effect of various milling processing parameters on processed silicon suboxide-graphitic carbon composite structure, samples 23-34 were formed as described above. For samples 23-28, processed silicon suboxide composites were formed with SiO wet milling or dry milling at 300 rpm or 350 rpm for 1 hour or 15 hours. Samples 29-34 were prepared from the processed silicon suboxide composite samples 13-18. Processed silicon suboxide-graphitic carbon composite samples 23-34 were formed from the processed silicon suboxide composites by SiO/graphite milling at 200 rpm or 300 rpm for 0.5 hours to 4 hours (0.5 hrs $\leq s_1 < s_2 < s_3 < s_4 \leq 4$ hrs), to form the composite samples. Table 4 displays the process parameters and structural characteristics of the samples.

the effect of SiO wet milling on the formation of the composites, Table 4 demonstrates that wet milling of SiO prior to milling with graphite produced a processed silicon suboxide-graphitic carbon composite sample (sample 29) having a smaller surface area and mean particle diameter relative to the analogous processed silicon suboxide-graphitic carbon composite sample (sample 25) formed by starting with dry milled SiO, which is again consistent with a less porous material being formed during the wet milling of SiO.

The effect of SiO milling parameters on processed silicon suboxide-graphitic carbon composites can be seen by comparing samples 13-18 in Table 3 with samples 29-34 (made from samples 13-18) in Table 3. Referring to Tables 3 and 4, samples prepared with longer SiO milling times generally had smaller processed silicon suboxide-graphitic carbon composite mean particle sizes. As explained above with respect to samples 13-18, longer SiO milling times generally translated into samples have smaller processed silicon suboxide mean particle sizes. Table 4 demonstrates for most samples tested, smaller processed silicon suboxide mean particle sizes generally translated into small processed silicon suboxide-graphitic carbon mean particle sizes. Although, it is noted that sample 33 (processed silicon

TABLE 4

| | SiO Milling Parameters | | | Processed SiO/Graphite Milling Parameters | | | | |
|---|---|---|---|---|---|---|---|---|
| Sample | Milling Type | Speed (RPM) | Time (Hours) | Milling Type | Speed (RPM) | Time (Hours) | SA, (m2/g) | D50 (μm) |
| 23 | dry | 350 | $t_8$ | dry | 300 | $s_1$ | 17.4 | 3.5 |
| 24 | dry | 350 | $t_8$ | dry | 300 | $s_2$ | 20.6 | 1.5 |
| 25 | dry | 350 | $t_8$ | dry | 300 | $s_3$ | 24.1 | 1.5 |
| 26 | dry | 350 | $t_8$ | dry | 300 | $s_4$ | 28 | 1.3 |
| 27 | dry | 350 | $t_8$ | dry | 200 | $s_2$ | 16.2 | 1.5 |
| 28 | dry | 350 | $t_8$ | dry | 200 | $s_3$ | 20.4 | 1 |
| 29 | wet | 300 | $t_1$ | dry | 300 | $s_3$ | 16.7 | 0.91 |
| 30 | wet | 300 | $t_2$ | dry | 300 | $s_3$ | 17.0 | 0.74 |
| 31 | wet | 300 | $t_4$ | dry | 300 | $s_3$ | 17.6 | 0.59 |
| 32 | wet | 200 | $t_2$ | dry | 300 | $s_3$ | 17.4 | 0.98 |
| 33 | wet | 200 | $t_3$ | dry | 300 | $s_3$ | 12.6 | 0.53 |
| 34 | wet | 200 | $t_5$ | dry | 300 | $s_3$ | 17.4 | 0.67 |

Referring to Table 4, increased SiO/graphite milling times generally resulted in processed silicon suboxide-graphitic carbon composites having smaller mean particle diameters and increased surface areas. For samples 23-26, the mean particle diameter generally decreased (form 3.5 μm to 1.3 μm) and the surface area increased (from 17.4 m$^2$/g to 28 m$^2$/g) when the milling time was increased from 0.5 hours to 4 hours. Notably, increasing the milling time from sample 24 to sample 25 did not appear to further reduce the mean particle size but the surface area was further increased from 20.6 m$^2$/g (sample 24) to 24.1 m$^2$/g (sample 25). Similarly, for samples 27 and 28, as the processed SiO/Graphite milling time increased from sample 27 to sample 28, the mean particle diameter decreased from 1.5 μm to 1 μm and the surface area increased from 16.2 m$^2$/g to 20.4 m$^2$/g. Additionally, Table 4 demonstrates that reduced milling speeds generally resulted in samples having reduced surface areas and reduced mean particle diameters. Comparison of sample 24 with sample 27 and comparison of sample 25 with sample 28 demonstrates that reduced milling speed (samples 27 and 28) resulted in samples 27 and 28 having lower surface areas and similar or smaller mean particle diameters relative to samples 24 and 25, respectively. With respect to suboxide mean particle size of 0.67 μm, see Table 3) had a smaller processed silicon suboxide-graphitic carbon mean particle size than sample 34 (processed silicon suboxide mean particle size of 0.64). With respect to surface area, again, with the exception of sample 33, longer processed silicon suboxide milling times resulted in larger increased composite surface areas, due to the smaller mean particle sizes.

Figure 4:
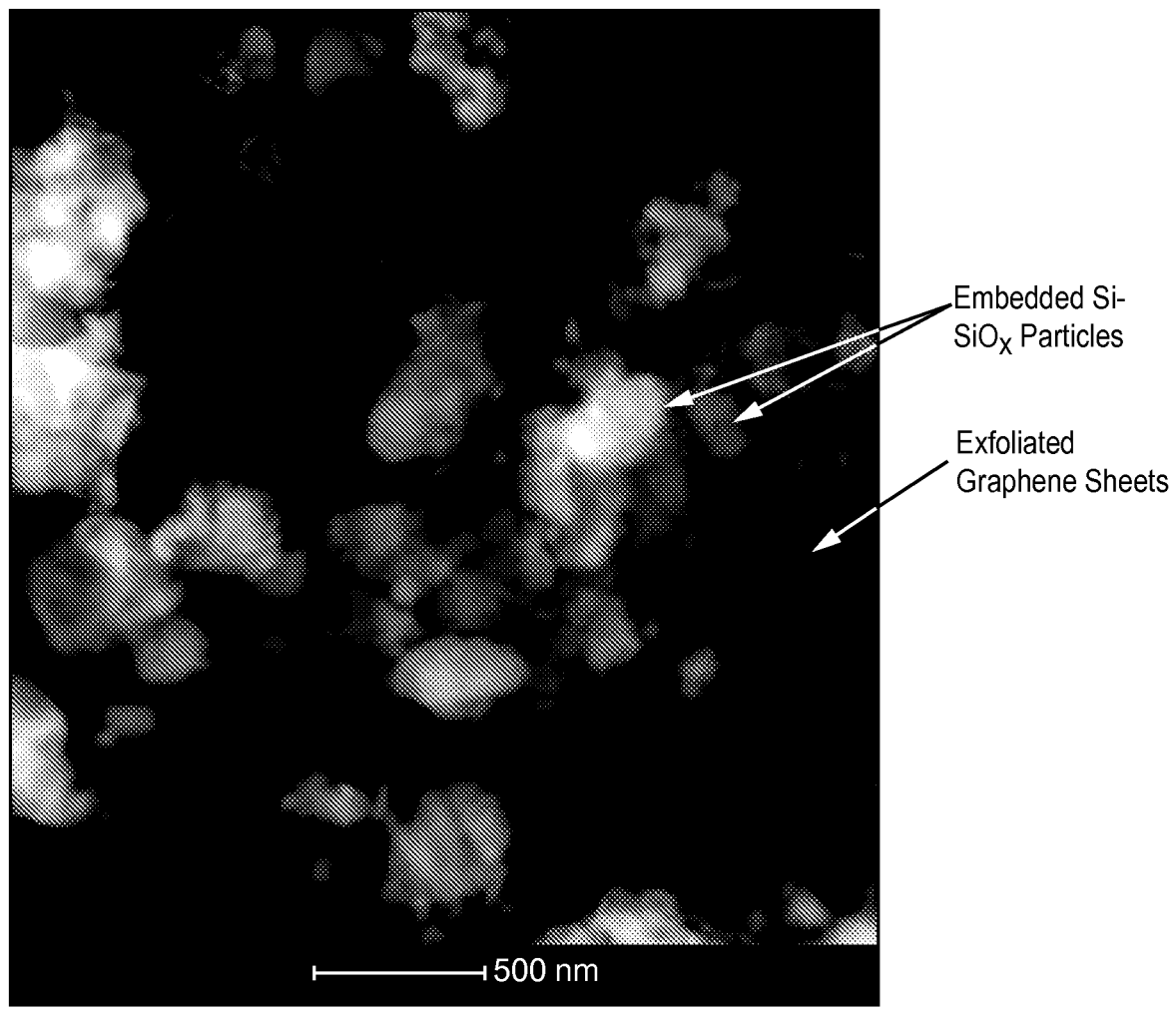
FIG. 4 is a TEM image of a processed silicon suboxide-graphitic carbon composite.
Figure 5A:
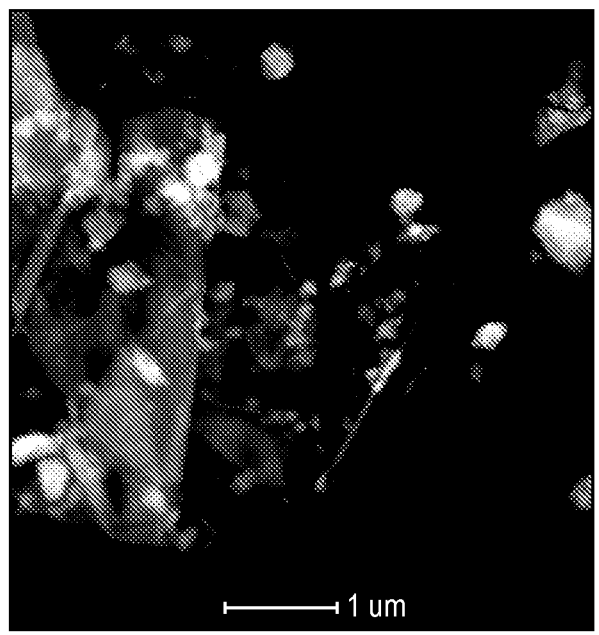
FIG. 5a is a TEM image of the composite depicted in FIG. 4, taken at lower magnification.
Figure 5B:
FIG. 5b is a TEM image of the composite depicted in FIG. 5a, taken at lower magnification.
Figure 6:
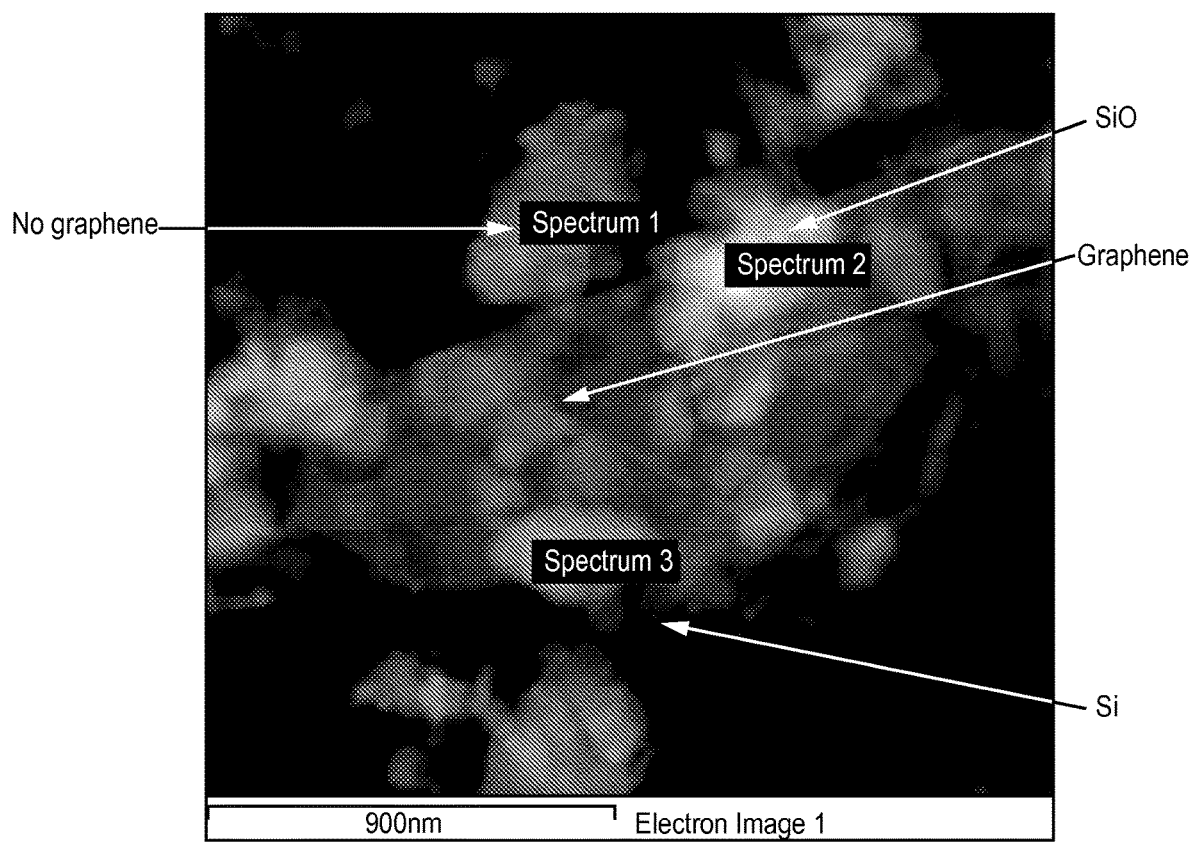
FIG. 6 is an enlargement of a portion of the TEM image depicted in FIG. 4.
Figure 7A:
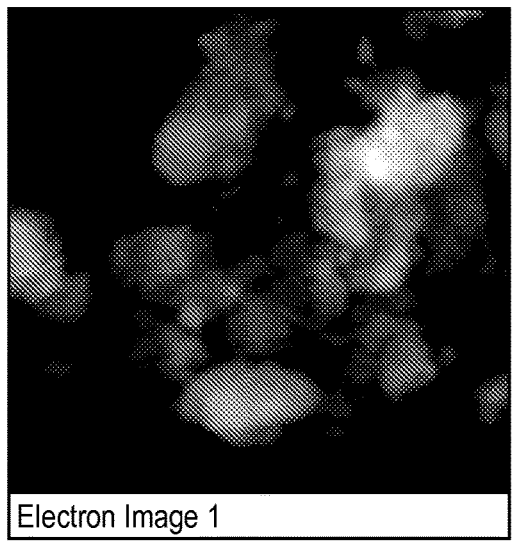
FIG. 7a displays a portion of the TEM image depicted in FIG. 6 indicating the location at which EDS analysis was performed on the corresponding sample.
Figure 7B:
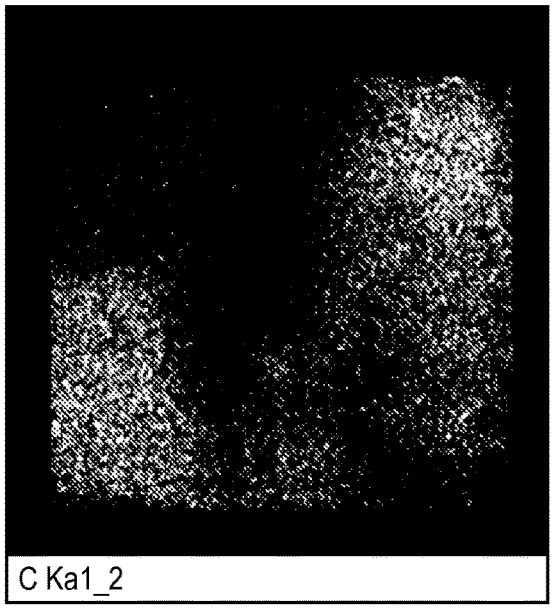
Figure 7C:
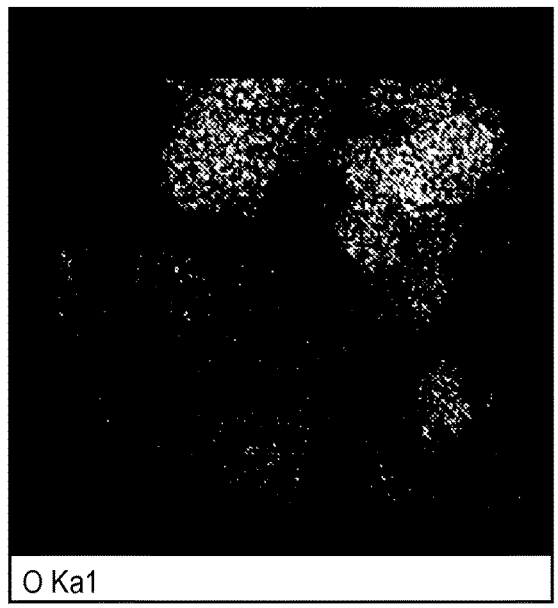
Figure 7D:
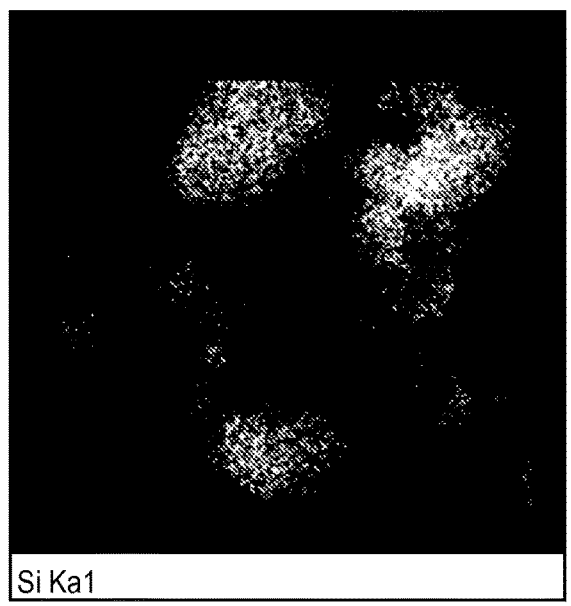

To demonstrate the structure of a representative composite, a processed silicon suboxide-graphitic carbon composite sample was formed (sample 25) as described above with SiO dry milling. FIGS. 4 and 5a and 5b show transmission electron microscopy (TEM) images of sample 25. Referring to the figures, the TEM images clearly show embedded Si—SiO$_x$ particles in exfoliated graphene sheets. In particular, the TEM images demonstrate exfoliation of graphite to form graphene sheets and the formation of nanoparticles from micron sized SiO, during milling. The TEM images also show that SiO and Si particles are embedded between the graphene sheets. To investigate the local composition of a representative processed silicon suboxide-graphitic carbon composites, energy dispersive X-ray spectroscopy (EDS) analysis was performed on sample 25 in conjunction with the TEM analysis. FIG. 6 is a cropped reproduction of the TEM image displayed in FIG. 4 and denotes the locations at which EDS spectra were obtained. Table 5 displays the results of the EDS analysis on sample 25 in atomic percent of the constituent elements. Referring to Table 5 and FIG. 6, EDS analysis demonstrates that the sample areas corresponding to spectra 1 and 2 comprise SiO without and with graphene coverage, respectively. Furthermore, Table 5 and FIG. 6 are consistent with the sample area with spectrum 3 corresponding to elemental Si with graphene coverage. To obtain a visualization of the local composition of sample 25, two dimensional EDS mappings were obtained and are displayed in FIGS. 7a-7d. FIG. 7a displays a portion of the TEM image displayed in FIG. 6 and corresponds to the sample area in which EDS analysis was performed to obtain elemental mappings. FIGS. 7b-7d corresponding to EDS mappings of carbon, oxygen and silicon, respectively, onto the two dimensional sample area displayed in FIG. 7a. In FIGS. 7b-7d, lighter areas correspond to higher atomic concentrations and darker areas correspond to lower atomic concentrations. FIG. 7b (carbon analysis) demonstrates the presence of the graphene sheet formed from the exfoliation of graphite during milling. FIGS. 7c (oxygen analysis) and 7d (silicon analysis) demonstrate the presence of SiO as well as SiO particles and Si particles in the processed silicon suboxide-graphitic carbon composite of sample 25.

TABLE 5

| Location | Carbon (at %) | Oxygen (at %) | Silicon (at %) | Compound/ Element |
|---|---|---|---|---|
| Spectrum 1 | 44.71 | 28.44 | 26.85 | SiO |
| Spectrum 2 | 71.83 | 15.28 | 12.9 | SiO |
| Spectrum 3 | 80.88 | 4.67 | 14.45 | Si | and batteries 8-13 were fabricated from samples 30-35 (SiO wet milling), respectively. Each battery had an electrode comprising a processed silicon suboxide-graphitic carbon composite and a lithium foil counter electrode. After battery assembly, the batteries were cycled as described above for at least 50 cycles, and the corresponding charge and discharge capacities were measured. Table 6 displays the milling parameters, initial battery performance and cycling performance of each of the batteries. It should be noted that for batteries with a lithium foil counter electrode, the transfer of lithium ions through the electrolyte and subsequent intercalation into the processed silicon suboxide-graphitic carbon composite electrode is a spontaneous process, so that the silicon based active material functions as the cathode.

The results in Table 6 indicate the effect of milling parameters on the cycling performance of batteries formed from the processed silicon suboxide-graphitic carbon composite samples in Table 4. Referring to Table 6, for batteries formed using a processed SiO/Graphite milling speed of 300 rpm (batteries 1-4, formed from samples 23-26), increased cycling performance was observed with increased milling times up to 2 hour. Referring to the results for batteries 1-3, increased milling times resulted in lower first cycle IRCL and increased C/3 specific discharge capacities. However, batteries 2 and 3 ($t_2$ and $t_3$ milling times, respectively) had slightly decreased capacity retention after 50 cycles relative to battery 1 ($t_1$ milling time). For battery 4, which was also formed using a processed SiO/Graphite milling speed of 300 rpm but using a corresponding milling time of $t_4$, battery performance was generally not improved relative to batteries 1-3. In particular, while battery 4 had a lower first cycle IRCL relative to batteries 1-3, battery 4 had the lowest C/3 specific discharge capacity as well a the lowest capacity retention after 50 cycles relative to batteries 1-3. Notably, that battery 4 was formed from sample 26, which had the highest surface area relative to samples 23-25 (used to form batteries 1-3, respectively).

TABLE 6

| Battery Number | 1st Cycle Charge Capacity at C/20 (mAh/g) | 1st Cycle Discharge Capacity at C/20 (mAh/g) | IRCL (%) | Discharge capacity at C/3 (mAh/g) | % Cap. Retained after 50 cycles | Loading (mg/cm$^2$) | Density (g/cc) | Peel Test |
|---|---|---|---|---|---|---|---|---|
| 1 | 2409 | 1579 | 35 | 1431 | 85 | 2.7 | 0.83 | N/A |
| 2 | 2432 | 1609 | 34 | 1499 | 83 | 2.5 | 0.8 | N/A |
| 3 | 2407 | 1630 | 32 | 1559 | 83 | 2.5 | 0.8 | 0.2 |
| 4 | 2283 | 1522 | 33 | 1326 | 75 | 2.5 | 0.77 | 0.48 |
| 5 | 2604 | 1631 | 37 | 1431 | 81 | 2.3 | 0.6 | 0.29 |
| 6 | 2644 | 1724 | 35 | 1426 | 87 | 2.1 | 0.6 | 0.23 |
| 7 | 2543 | 1661 | 35 | 1455 | 91 | 2.5 | 0.5 | 0.2 |
| 8 | 2364 | 1574 | 33 | 1349 | 92 | 4.4 | 0.82 | |
| 9 | 2264 | 1520 | 33 | 1182 | 82 | 4.2 | 0.92 | |
| 10 | 2308 | 1807 | 28 | 1209 | 77 | 4.0 | 0.81 | |
| 11 | 2259 | 1525 | 33 | 1194 | 86 | 4.5 | 0.71 | |
| 12 | 2380 | 1574 | 34 | 1274 | 80 | 3.6 | 0.81 | |
| 13 | 2365 | 1590 | 33 | 1254 | 80 | 3.8 | 0.85 | |

Example 3—Effect of Milling Parameters on the Performance of Batteries Comprising Processed Silicon Suboxide-Graphitic Carbon Electrodes This Example demonstrates the effects of milling parameters on the performance of batteries comprising processed silicon suboxide-graphitic carbon electrodes.

To demonstrate the effect of milling parameters, 13 batteries (batteries 1-13) were fabricated. Batteries 1-7 were fabricated samples 23-29 (SiO dry milling), respectively, For processed SiO/Graphite milling speeds at 200 rpm (batteries 5 and 6 formed from samples 27 and 28), increased milling times increased the first cycle IRCL and increased capacity retention after 50 cycles. The C/3 specific discharge capacities of batteries 5 and 6 were similar. Furthermore, with respect to processed SiO/Graphite milling speed, comparison of battery 2 (300 rpm) with battery 5 (200 rpm) and comparison of battery 3 (300 rpm) with battery 6 (200 rpm) demonstrate that decreased milling speed resulted in batteries having a higher first cycle IRCL and lower C/3 specific discharge capacities. However, battery 2 had a higher capacity retention after 50 cycles relative to battery 5, while battery 3 had a lower capacity retention after 50 cycles relative to battery 6.

With respect to the effect of SiO wet milling on battery performance, comparison of batteries 7-9 (wet milling of SiO) with batteries 2-4 (dry milling of SiO) indicates the batteries fabricated with SiO wet milling had smaller C/20 and C/3 charge/discharge capacities and similar first cycle irreversible capacity losses. However, the batteries fabricated with SiO wet milling had somewhat improved capacity retention after 50 cycles in some embodiments relative to the batteries formed with SiO dry milling. The effect of SiO milling time on capacity on batteries prepared with SiO wet milling can be seen by comparison of batteries 13-15 and 16-17 in Table 6. The table reveals that for a given SiO milling rate, for the samples tested, increased SiO milling times generally resulted in lower or similar capacity retention.

Example 4—Effect of Graphitic Carbon Concentrations on the Structure of Processed Silicon Suboxide-Graphitic Carbon Composites and the Performance of Batteries Made Therefrom This Example demonstrates the effect of varying the SiO and graphite concentrations on the structure of processed silicon suboxide-graphitic carbon composites and the ultimate effects on the cycling performance of batteries made from those composites. The effect of electrode loading is also explored.

To demonstrate the effect graphitic carbon concentrations on composite structure, samples 35-38 were prepared as described above with the amount of graphite being varied. Processed SiO was formed by dry milling SiO at for $t_8$ hours, and a processed silicon suboxide-graphitic carbon composite was formed by milling the corresponding processed silicon suboxide composite with graphite at 300 rpm for $t_3$ hours. The relative concentration of SiO to graphite was different for each sample. To test cycling performance, batteries 14-17 were fabricated as described above with electrodes formed from samples 35-38, respectively, and lithium foil counter electrodes. Tables 7 and 8 display the sample milling parameters and structural characteristics and battery performance results.

TABLE 7

| Sample | SiO:Gr (weight ratio) | Speed (rpm) | Time (hours) | Surface Area, (m2/g) | Median Particle size, microns |
|---|---|---|---|---|---|
| 35 | 90:10 | 300 | $t_3$ | 24.1 | 1.5 |
| 36 | 91:09 | 300 | $t_3$ | 24.3 | N/A |

TABLE 7-continued

| Sample | SiO:Gr (weight ratio) | Speed (rpm) | Time (hours) | Surface Area, (m2/g) | Median Particle size, microns |
|---|---|---|---|---|---|
| 37 | 92:08 | 300 | $t_3$ | 24.4 | N/A |
| 38 | 95:05 | 300 | $t_3$ | 19.1 | 1.5 |

TABLE 8

| Battery | 1st Cycle Charge Capacity at C/20 (mAh/g) | 1st Cycle Discharge Capacity at C/20 (mAh/g) | IRCL (%) | Discharge capacity at C/3 (mAh/g) | % Cap. Retained after 50 cycles | Loading, (mg/cm$^2$) | Density (g/cc) |
|---|---|---|---|---|---|---|---|
| 14 | 2426 | 1553 | 36 | 1033 | 90 | 3.4 | 0.78 |
| 15 | 2461 | 1641 | 33 | 1105 | 93 | 2.9 | 0.70 |
| 16 | 2520 | 1688 | 33 | 1199 | 87 | 3.1 | 0.74 |
| 17 | 2376 | 1619 | 32 | 1336 | 68 | 4.0 | N/A |

The results in Table 7 indicate that the samples formed with over 5 weight percent (wt %) graphite (samples 35-37) had similar surface areas while the sample formed with 5 wt % graphite (sample 38) has a smaller surface relative to samples 35-37. With respect to the corresponding battery performance, Table 8 demonstrates that over 5 wt % graphite (batteries 14-16), batteries with increased weight percent graphite generally had smaller first cycle charge and discharge capacities, smaller or similar first cycle IRCL and reduced C/3 specific discharge capacities. Battery 17, formed using 5 wt % graphite, had the lowest first cycle irreversible capacity loss and highest C/3 specific discharge capacity. However, battery 17 also had the lowest capacity retention after 45 cycles relative to batteries 14-16. Notably, battery 16 was formed from sample 38, which had the lowest surface area relative to samples 35-37 form which batteries 14-16 were formed.

Example 5—Cycling Performance of Batteries Having Electrodes Comprising Processed Silicon Suboxide-Graphitic Carbon Composite This Example demonstrates the cycling performance of batteries comprising a processed silicon suboxide-graphitic carbon electrodes and lithium foil or lithium metal oxide based counter electrode.

To demonstrate cycling performance, 3 batteries (batteries 18-20) were formed as described above. Batteries 18 and 19 were formed with lithium foil counter electrodes and comprised a commercial silicon composite material for the anode electrode (battery 18) or a representative good cycling processed silicon suboxide-graphitic carbon electrode (battery 19). Battery 20 was a formed as a battery that comprised a processed silicon suboxide-graphitic carbon anode and a high capacity manganese rich cathode, as noted above. To demonstrate performance, batteries 18-20 were cycled between 1.5 V and 0.005 V at a charge/discharge rate of C/3 for 55 cycles. Battery 21 was cycled between 4.35 V and 1.5 V for 300 cycles were cycled as described above, corresponding to an 80% depth of discharge for battery 14. During the cycling of the batteries, the specific charge and discharge capacities were measured and the results are plotted in FIGS. 8 and 9.

Figure 8:
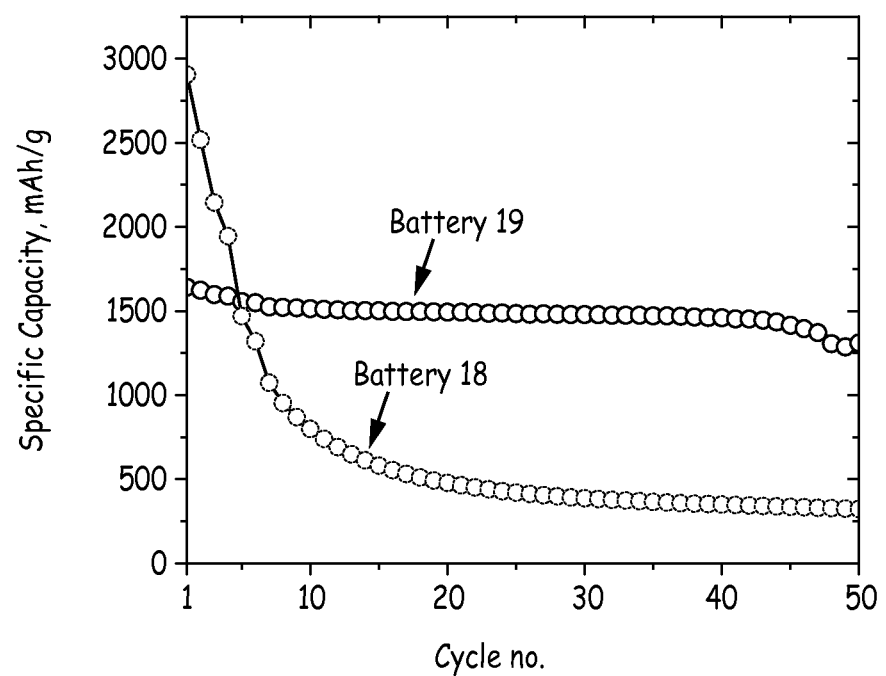
FIG. 8 is a graph displaying plots of cycle number versus specific charge and discharge capacities of two half-cell batteries, one battery comprising a commercially obtained silicon composite electrode and one battery comprising a processed silicon suboxide-graphitic carbon composite electrode.
Figure 9:
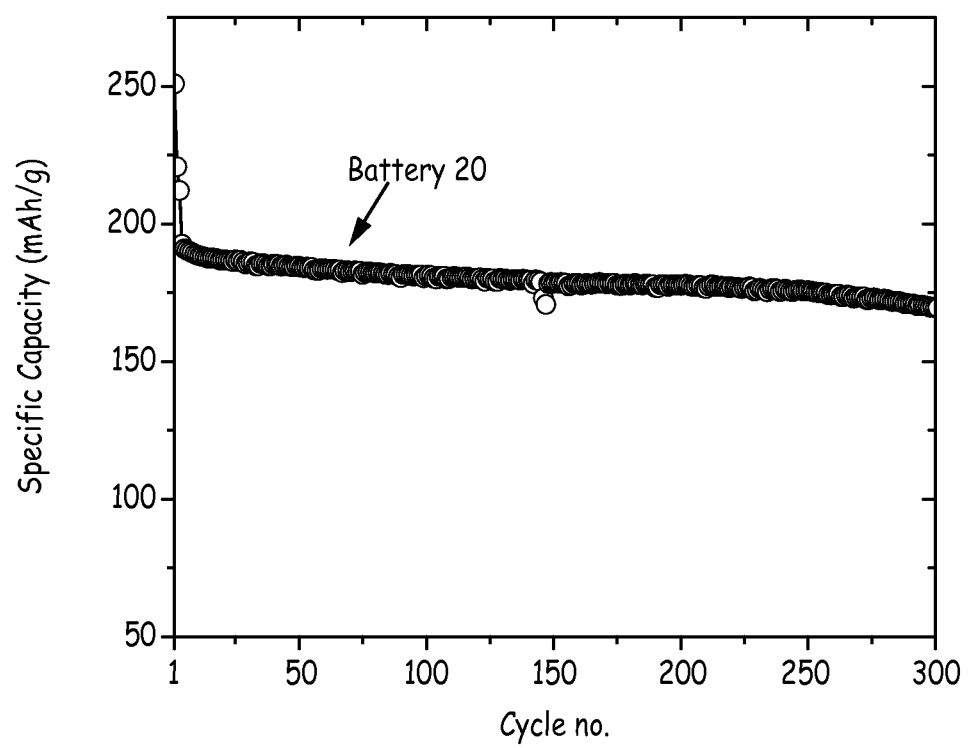
FIG. 9 is a graph displaying specific charge and discharge capacities of a full cell battery comprising a processed silicon suboxide-graphitic carbon composite electrode.

FIG. 8 is a graph containing plots of specific discharge capacities as a function of cycle number for batteries 18 and 19. The results in FIG. 8 demonstrates that battery formed with the processed silicon suboxide-graphitic carbon electrode (battery 19) had significantly improved cycling performance over the battery formed with the commercial silicon composite electrode. FIG. 9 is a graph containing plots of charge and discharge capacities per unit area of the negative electrode as a function of cycle number for battery 20. The figure demonstrates battery 20 had excellent cycling performance over 300 cycles. In particular, after the 300th cycle, the capacity retention of battery 20 was about 91% percent.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A composite material comprising processed silicon suboxide and graphitic carbon comprising graphene as determined by observation of graphene in electron micrographs and a decrease in graphite x-ray scattering, wherein the composite material has a D50 volume average particle size of no more than about 5 microns, a BET surface area from about 5 $m^2/g$ to 35 $m^2/g$ and a discharge capacity of at least 1100 mAh/g at a rate of C/20 discharged from 1.5V to 0.005V against lithium metal, wherein the composite material has from about 0.5 weight percent to about 18 weight percent graphitic carbon.

2. The composite material of claim 1 having an x-ray scattering diffractogram with visible peaks corresponding to crystalline silicon.

3. The composite material of claim 1 having an x-ray scattering diffractogram with no visible peaks corresponding to crystalline silicon.

4. The composite material of claim 1 wherein the composite material has from 1.0 weight percent to 15 weight percent graphitic carbon.

5. The composite material of claim 1 having a BET surface area from 14 $m^2/g$ to 33 $m^2/g$ and a D50 volume average secondary particle size of no more than 4 microns.

6. The composite material of claim 1 wherein the material has a 50th cycle discharge capacity that is at least 87% of the 5th cycle discharge capacity when cycled against lithium from 1.5V to 0.005V at a discharge rate of C/3.

7. The composite material of claim 1 wherein the processed silicon suboxide is formed through high energy mechanical milling of silicon suboxide prior to combination with graphitic carbon.

8. The composite material of claim 7 wherein the graphene sheets are formed by the high energy mechanical milling of the processed silicon suboxide with graphite powder.

9. The composite material of claim 8 wherein the high energy mechanical milling is performed with zirconium oxide milling medium.

10. The composite material of claim 8 wherein the material has a 50th cycle discharge capacity that is at least 87% of the 5th cycle discharge capacity when cycled against lithium from 1.5V to 0.005V at a discharge rate of C/3.

11. The composite material of claim 10 comprising from 2 weight percent to 10 weight percent graphitic carbon.

12. The composite material of claim 10 having a specific discharge capacity of at least 1400 mAh/g at a rate of C/20 discharged from 1.5V to 0.005V against lithium metal.

13. The composite material of claim 10 having a specific discharge capacity of at least 1250 mAh/g at a rate of C/3 discharged from 1.5V to 0.005V against lithium metal.

14. The composite material of claim 10 having a 50th cycle discharge capacity that is at least 90% of the 5th cycle discharge capacity when cycled against lithium from 1.5V to 0.005V at a discharge rate of C/3.

15. A lithium ion secondary battery comprising a positive electrode, a negative electrode, a separator between the positive electrode comprising a lithium metal oxide and the negative electrode and an electrolyte comprising lithium ions, wherein the negative electrode comprises a composite material comprising processed silicon suboxide and graphitic carbon comprising graphene as determined by observation of graphene in electron micrographs and a decrease in graphite x-ray scattering is in graphene sheets and having at a discharge rate of C/3 at the 50th cycle a positive electrode specific capacity of at least 150 mAh/g and a negative electrode specific capacity of at least 1000 mAh/g when discharged from 4.5V to 1V from the 7th cycle to the 50th cycle at a rate of C/3.

16. The lithium ion secondary battery of claim 15 having at a discharge rate of C/3 at the 50th cycle a positive electrode specific capacity of at least 170 mAh/g and a negative electrode specific capacity of at least 1150 mAh/g when discharged from 4.5V to 1V.

17. The lithium ion secondary battery of claim 15 wherein the battery exhibits a discharge capacity decrease of no more than 15 percent at the 50th discharge cycle relative to the 7th discharge cycle.

18. The lithium ion secondary battery of claim 15 wherein the composite material has a BET surface area from 5 $m^2/g$ to about 35 $m^2/g$.

19. The lithium ion secondary battery of claim 15 wherein the composite material has from 0.5 weight percent to 10 weight percent graphitic carbon a D50 volume average secondary particle size of no more than 5 microns.

20. The lithium ion secondary battery of claim 15 wherein the positive electrode active material represented by the formula $Li_{1+b}Ni_\alpha Mn_\beta Co_\gamma A_\delta O_{2-z}F_z$, where b ranges from 0.01 to 0.3, $\alpha$ ranges from 0 to about 0.4, $\beta$ range from 0.2 to 0.65, $\gamma$ ranges from 0 to 0.46, $\delta$ ranges from 0 to 0.15 and z ranges from 0 to 0.2 with the proviso that both $\alpha$ and $\gamma$ are not zero, and where A is Mg, Sr, Ba, Cd, Zn, Al, Ga, B, Zr, Ti, Ca, Ce, Y, Nb, Cr, Fe, V, Li or combinations thereof.

21. The lithium ion secondary battery of claim 15 further comprising supplemental lithium distinct from the lithium supplied by the positive electrode active material.

22. The lithium ion secondary battery of claim 15 wherein an active material of the positive electrode comprises a stabilization coating.

23. The lithium ion secondary battery of claim 22 wherein the stabilization coating comprises a metal halide.

* * * * *